United States Patent
Calder et al.

(10) Patent No.: US 12,038,510 B2
(45) Date of Patent: Jul. 16, 2024

(54) HIGH DYNAMIC RANGE DIRECT TIME OF FLIGHT SENSOR WITH SIGNAL-DEPENDENT EFFECTIVE READOUT RATE

(71) Applicant: Sense Photonics, Inc., Durham, NC (US)

(72) Inventors: Neil Calder, Edinburgh (GB); Tarek Al Abbas, Edinburgh (GB); Hod Finkelstein, Berkeley, CA (US)

(73) Assignee: Sense Photonics, Inc., Durham, NC (US)

( * ) Notice: Subject to any disclaimer, the term of this patent is extended or adjusted under 35 U.S.C. 154(b) by 1047 days.

(21) Appl. No.: 16/733,463

(22) Filed: Jan. 3, 2020

(65) Prior Publication Data

US 2020/0217965 A1    Jul. 9, 2020

Related U.S. Application Data

(60) Provisional application No. 62/788,349, filed on Jan. 4, 2019.

(51) Int. Cl.
*G01S 17/89* (2020.01)
*G01S 7/481* (2006.01)
(Continued)

(52) U.S. Cl.
CPC .............. *G01S 17/89* (2013.01); *G01S 7/481* (2013.01); *G01S 7/4811* (2013.01); *G01S 7/4863* (2013.01); *G01S 7/4865* (2013.01)

(58) Field of Classification Search
CPC ...... G01S 7/481; G01S 7/4863; G01S 7/4811; G01S 7/4865
See application file for complete search history.

(56) References Cited

U.S. PATENT DOCUMENTS

| 7,547,872 B2 | 6/2009 | Niclass et al. |
| 9,521,337 B1 | 12/2016 | Shen et al. |
| (Continued) | | |

FOREIGN PATENT DOCUMENTS

| CN | 104702861 A | 6/2015 |
| CN | 104914446 A | 9/2015 |
| (Continued) | | |

OTHER PUBLICATIONS

Extended European Search Report Corresponding to European Application No. 20784021.6 (9 pages) (Jul. 28, 2022).

(Continued)

*Primary Examiner* — Shawn S An
(74) *Attorney, Agent, or Firm* — Kilpatrick Townsend & Stockton LLP

(57) ABSTRACT

A Light Detection And Ranging (LIDAR) system includes an emitter unit including one or more emitter elements configured to output an emitter signal, and a detector array including a plurality of detector elements. A respective detector element of the plurality of detector elements is configured to output detection signals in response to photons incident thereon. At least one control circuit is configured receive the detection signals output from the respective detector element over one or more cycles of the emitter signal, generate a flag signal responsive to detection events indicated by the detection signals exceeding a detection threshold, and output a readout signal for the respective detector element responsive to the flag signal. Related devices and methods of operation are also discussed.

22 Claims, 9 Drawing Sheets

(51) Int. Cl.
*G01S 7/4863* (2020.01)
*G01S 7/4865* (2020.01)

(56) References Cited

U.S. PATENT DOCUMENTS

| | | | | |
|---|---|---|---|---|
| 11,493,614 | B2* | 11/2022 | Gong | G01S 7/4861 |
| 2008/0149838 | A1* | 6/2008 | Parvin | G01T 1/2008 |
| | | | | 250/356.2 |
| 2009/0272882 | A1 | 11/2009 | Rabner | |
| 2012/0075615 | A1 | 3/2012 | Niclass et al. | |
| 2013/0250272 | A1 | 9/2013 | Ludwig | |
| 2014/0022431 | A1 | 1/2014 | Chen et al. | |
| 2014/0326854 | A1 | 11/2014 | Delbruck et al. | |
| 2015/0116695 | A1 | 4/2015 | Bartolome et al. | |
| 2018/0081061 | A1* | 3/2018 | Mandai | G01B 11/026 |
| 2018/0231646 | A1* | 8/2018 | Schrey | G01S 7/4876 |
| 2018/0259625 | A1 | 9/2018 | Gnecchi et al. | |
| 2018/0301872 | A1 | 10/2018 | Burroughs et al. | |
| 2018/0341009 | A1 | 11/2018 | Niclass et al. | |
| 2019/0250257 | A1* | 8/2019 | Finkelstein | G01S 7/4863 |
| 2019/0331776 | A1* | 10/2019 | Aotake | G01S 7/497 |
| 2019/0369248 | A1* | 12/2019 | Beer | G01S 17/10 |
| 2020/0200863 | A1* | 6/2020 | Booij | G01S 5/26 |

FOREIGN PATENT DOCUMENTS

| | | |
|---|---|---|
| CN | 107807364 A | 3/2018 |
| CN | 109791195 A | 5/2019 |
| KR | 20180049937 A | 5/2018 |
| WO | 2013/092666 | 7/2014 |

OTHER PUBLICATIONS

Notification of Transmittal of the International Search Report and the Written Opinion of the International Searching Authority, or the Declaration, in corresponding PCT Application No. PCT/US2020/012141 (Date: Oct. 21, 2020).
Berkovich et al. "A Scalable 20x20 Fully Asynchronous SPAD-Based Imaging Sensor with AER Readout" 2015 EEE International Symposium on Circuits and Systems (ISCAS) (pp. 1110-1113) (May 24-27, 2015).
Niclass et al. "A CMOS 64x48 Single Photon Avalanche Diode Array with Event-Driven Readout" Proceedings of the 32nd European Solid-State Circuits Conference (5 pages) (Oct. 2006).
Takahashi et al. "A 4.1 Mpix 280fps Stacked CMOS Image Sensor with Array-Parallel ADC Architecture for Region Control" 2017 Symposium on VLSI Circuits (pages C244-C245) (Jun. 5-8, 2017).
U.S. Appl. No. 62/799,116 "Strobe Window Dependent Illumination Schemes for Flash LIDAR" filed Jan. 31, 2019; Robert Henderson et al.
U.S. Appl. No. 62/814,452 "Extended Dynamic Range and Reduced Power Imaging and LIDAR SPAD Arrays" filed Mar. 6, 2019; Robert Henderson et al.
CN202080008004.8, "Office Action", Aug. 19, 2023, 15 pages.
CN202080008004.8, "Office Action", Mar. 16, 2024, 15 pages.
EP20784021.6, "Office Action", Mar. 20, 2024, 3 pages.

* cited by examiner

HIGH DYNAMIC RANGE DIRECT TIME OF FLIGHT SENSOR WITH SIGNAL-DEPENDENT EFFECTIVE READOUT RATE

CLAIM OF PRIORITY

This application claims the benefit of priority from U.S. Provisional Patent Application No. 62/788,349, filed Jan. 4, 2019 in the United States Patent and Trademark Office, the disclosure of which is incorporated by reference herein in its entirety.

FIELD

The present disclosure relates generally to image sensors, and more specifically to image sensors for imaging in Light Detection And Ranging (LIDAR) systems.

BACKGROUND

Time of flight (ToF) based imaging is used in a number of applications including range finding, depth profiling, and 3D imaging (e.g., LIDAR). Direct time of flight measurement includes directly measuring the length of time between emitting radiation and sensing the radiation after reflection from an object or other target. From this, the distance to the target can be determined.

The sensing of the reflected radiation may be performed using an array of image sensors. In imaging applications, dynamic range may refer to a range or ratio between the brightest and dimmest targets to be imaged. For example, high dynamic range image sensors such as CMOS image sensors, are described in publications US 2014/0022431 and WO 2013/092666. Some CMOS image sensors may include multiple photodetectors, such as photodiodes, and may perform multiple photodiode readouts per frame. The readouts may be non-destructive, that is, the photodiodes may not necessarily be reset upon readout, such that the photodiodes may continue to accumulate charge after a readout operation. In specific applications, the sensing of the reflected radiation may be performed using an array of photodetectors, such as an array of Single Photon Avalanche Diodes (SPADs). One or more photodetectors may define a detector pixel of the array.

SPAD arrays may be used as solid-state detectors in imaging applications where high sensitivity and timing resolution may be required. A SPAD is based on a semiconductor junction (e.g., a p-n junction) that may detect incident photons when biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively (e.g., by reducing the bias voltage) or passively (e.g., by using the voltage drop across a serially connected resistor), to allow the device to be "reset" to detect further photons. The initiating charge carrier can be photo-electrically generated by a single incident photon striking the high field region. It is this feature which gives rise to the name 'Single Photon Avalanche Diode'. This single photon detection mode of operation is often referred to as 'Geiger Mode'.

When imaging a scene, ToF sensors for LIDAR applications can include circuits that time stamp and/or count incident photons as reflected from a target. Some ToF pixel approaches may use digital or analog circuits to count the detection of photons and the arrival times of photons, also referred to as time-stamping. Digital counter circuits may be easier to implement and scale, but may be more expensive in terms of area (e.g., with respect to the physical size of the array). Analog counter circuits may be more compact, but may suffer from limited photon counting depth (bit depth), noise, and/or uniformity issues. To time-stamp incident photons, some SPAD array-based ToF pixel approaches have used a Time-to-Digital Converter (TDC), a Time to Amplitude Converter (TAC), or a counter plus an interpolator, e.g., a global time stamp count plus a TAC.

SPADS are asynchronous, event-driven devices, i.e., which output detection signals responsive to the event of detecting an incident photon. Therefore, digital readout across a shared medium can result in loss of temporally correlated signals originating from two or more SPADs in the array. For example, the publication "A CMOS 64×48 Single Photon Avalanche Diode Array with Event-Driven Readout" to Niclass et al. (ESSCIRC 2006) describes a column-level event-driven readout scheme in which a first pixel that is triggered (or "fires") in a column can prevent detection by other pixels in the column, which may be applicable for lower or medium photon rates. The first pixel may output an address for the subsequent processing electronics to identify which pixel of the column detected the photon, allowing non-sequential row-wise detection. Also, the publication "A Scalable 20×20 Fully Asynchronous SPAD-Based Imaging Sensor with AER Readout" to Berkovich et al. describes a SPAD sensor that can determine a threshold for readout using an address-event representation (AER) scheme based on row request and row acknowledge operations, whereby when a pixel has a high enough photon count, the address is transmitted off-chip for the pixel voltage to be readout as a count voltage. An arbiter is used to select the order for readout, to prevent multiple readout operations from occurring at once and thus data loss. While losses can be mitigated by the degree of sharing implemented using asynchronous digital readout schemes like AER, these techniques may increase circuit complexity without appreciable improvement in loss.

SUMMARY

Some embodiments described herein provide LIDAR systems including one or more emitter units (including one or more semiconductor lasers, such as surface- or edge-emitting laser diodes; generally referred to herein as emitters, which output emitter signals), one or more light detector pixels (including one or more photodetectors, such as semiconductor photodiodes, including avalanche photodiodes and single-photon avalanche detectors; generally referred to herein as detectors, which output detection signals in response to incident light), and one or more control circuits that are configured to selectively operate subsets of the emitter units and/or detector pixels (including respective emitters and/or detectors thereof) to provide a 3D time of flight (ToF) flash lidar system.

According to some embodiments of the present disclosure, a LIDAR system includes an emitter unit, a detector array, and at least one control circuit. The emitter unit includes one or more emitter elements that are configured to output an emitter signal. The detector array includes a plurality of detector elements, where a respective detector element of the plurality of detector elements is configured to output detection signals in response to photons incident thereon. The at least one control circuit is configured receive the detection signals output from the respective detector element over one or more cycles of the emitter signal, generate a flag signal responsive to detection events indicated by the detection signals exceeding a detection threshold, and output a readout signal for the respective detector element responsive to the flag signal.

In some embodiments, the readout signal may include first and second readout signals, and the at least one control circuit may be configured to output the first readout signal responsive to fewer of the cycles of the emitter signal than the second readout signal.

In some embodiments, the at least one control circuit may be configured to output the first and second readout signals responsive to first and second subsets of the detection signals indicating first and second targets, respectively, where the first target is closer to the detector array and/or more reflective than the second target.

In some embodiments, a period of the cycles of the emitter signal may correspond to a distance range. The at least one control circuit may be configured to output the first readout signal responsive to a first plurality of the cycles of the emitter signal corresponding to a first distance subrange of the distance range, and is configured to output the second readout signal responsive to a second plurality of the cycles of the emitter signal corresponding to a second distance subrange of the distance range that is farther than the first distance subrange.

In some embodiments, the respective detector element may be configured to output the detection signals during first and second strobe windows corresponding to the first and second distance subranges responsive to first and second strobe signals, respectively.

In some embodiments, the first plurality of the cycles of the emitter signal may define a first subframe, and the second plurality of the cycles of the emitter signal may define a second subframe.

In some embodiments, the at least one control circuit may be configured to output the readout signal responsive to the flag signal and a read signal that is sequentially applied to respective rows or columns of the detector elements in the detector array.

In some embodiments, the at least one control circuit may include a counting storage device that is configured store data indicated by the detection events, and a readout memory that is coupled to a read line. The at least one control circuit may be configured to reset the counting storage device and store the data indicated by the detection events in the readout memory responsive to the flag signal, and output the readout signal from the readout memory responsive to the flag signal and the read signal.

In some embodiments, the readout signal may include a count signal and/or a time integration signal, and the LIDAR system may be configured to calculate an estimated time of arrival of the photons based on the readout signal.

In some embodiments, the at least one control circuit may include a counter circuit and a time integration circuit. The counter circuit may be configured to count the detection events indicated by the detection signals, generate the count signal representing a number of the detection events, and output the flag signal responsive to the number of the detection events exceeding the detection threshold. The time integration circuit may be configured to generate the time integration signal based on respective times of the detection events.

In some embodiments, the system may include an analog-to-digital converter that is operable to convert a voltage on at least one read line coupled to the counter circuit and/or the time integration circuit responsive to the flag signal. The control circuit may be configured to output the voltage on the at least one read line to the analog-to-digital converters responsive to the read signal.

In some embodiments, the counter circuit and the time integration circuit may be configured to reset the count signal and the time integration signal, respectively, responsive to the flag signal, and to continue to count the detection events and integrate based on the respective times of the detection events, respectively, in the absence of the flag signal.

In some embodiments, the respective detector element may be configured to output the detection signals in response to the photons incident thereon during a detection window. The at least one control circuit may be configured to generate the flag signal responsive to sampling the detection signals at an oversampling rate having a period that is greater than a duration of a detection window.

In some embodiments, the at least one control circuit may be configured to set and/or vary the detection threshold responsive to real-time environmental and/or operating conditions indicated by one or more of the detector elements and/or at least one other sensor.

In some embodiments, the detection signals may indicate a distance range and/or reflectivity of a target facing the respective detector element, and the at least one control circuit may be configured to set and/or vary the detection threshold based on the distance range and/or reflectivity of the target.

In some embodiments, the at least one control circuit may be configured to apply the detection threshold to a subset of the detector elements of the detector array on a per detector element or per region basis.

In some embodiments, the at least one control circuit may be configured to operate the one or more emitters to decrease a power level of the emitter signal responsive to the first readout signal, or to increase the power level of the emitter signal responsive to the second read out signal.

In some embodiments, the at least one control circuit may be configured to operate the detector array to activate a smaller subset of the detector elements responsive to the first readout signal, or to activate a larger subset of the detector elements responsive to the second read out signal.

According to some embodiments of the present disclosure, a method of operating a LIDAR system includes operations performed by at least one control circuit. The operations include receiving, from a respective detector element of a detector array comprising a plurality of detector elements in response to photons incident thereon, detection signals output over one or more cycles of an emitter signal output from an emitter unit comprising one or more emitter elements; generating a flag signal responsive to detection events indicated by the detection signals exceeding a detection threshold; and outputting a readout signal for the respective detector element responsive to the flag signal.

In some embodiments, the readout signal may include first and second readout signals, and the first readout signal may be output responsive to fewer of the cycles of the emitter signal than the second readout signal.

In some embodiments, the first and second readout signals may be output responsive to first and second subsets of the detection signals indicating first and second targets, respectively, where the first target is closer to the detector array and/or more reflective than the second target.

In some embodiments, a period of the cycles of the emitter signal may correspond to a distance range. The first readout signal may be output responsive to a first plurality of the cycles of the emitter signal corresponding to first distance subrange of the distance range, and the second readout signal may be output responsive to a second plurality of the cycles of the emitter signal corresponding to a second distance subrange of the distance range that is farther than the first distance subrange.

In some embodiments, the readout signal may be output responsive to the flag signal and a read signal that is sequentially applied to respective rows or columns of the detector elements in the detector array.

According to some embodiments of the present disclosure, a LIDAR system includes an emitter unit including one or more emitter elements configured to output an emitter signal; a detector array including a plurality of detector elements, where a respective detector element of the plurality of detector element is configured to output detection signals in response to photons incident thereon; and at least one control circuit configured receive the detection signals output from the respective detector element over one or more cycles of the emitter signal. The at least one control circuit includes a counter circuit configured to count detection events indicated by the detection signals, generate a count signal representing a number of the detection events, and output a flag signal responsive to the number of the detection events exceeding a detection threshold; and a time integration circuit configured to generate a time integration signal based on respective times of the detection events. The at least one control circuit is configured to output a readout signal including the count signal and/or the time integration signal for the respective detector element responsive to the flag signal and a read signal that is sequentially applied to respective rows or columns of the detector elements in the detector array.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1A:
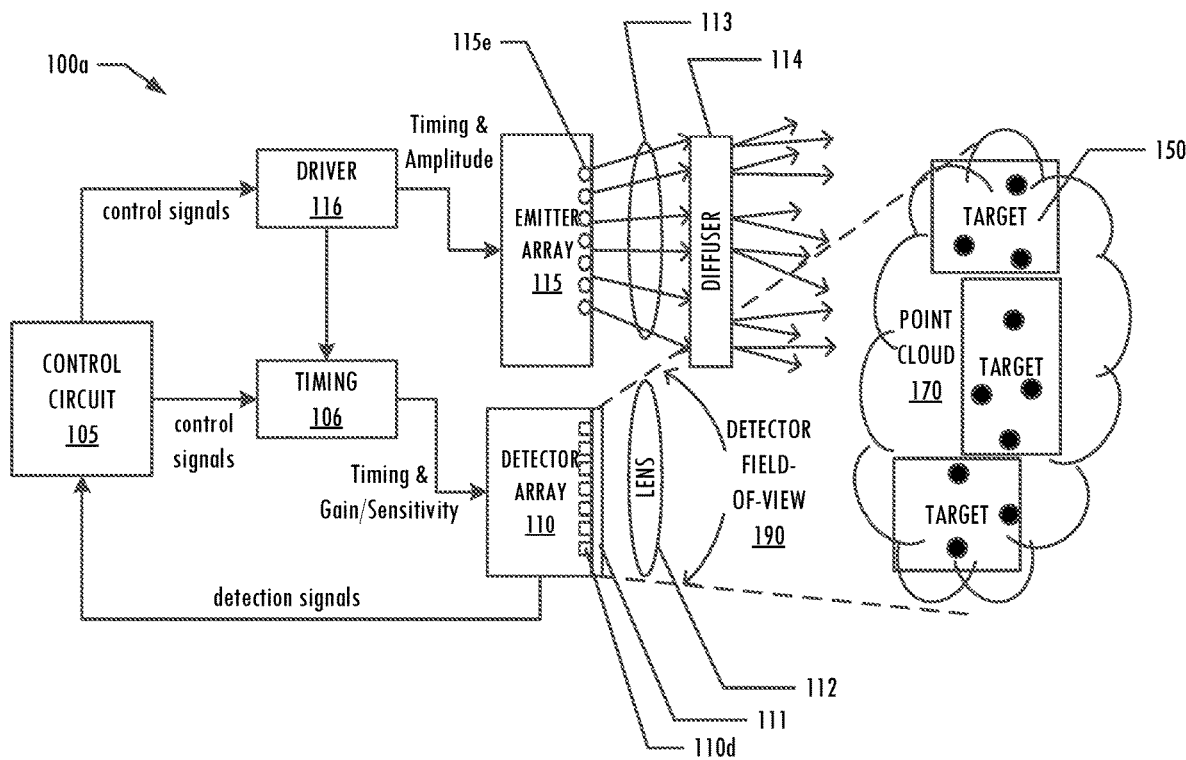
FIGS. 1A and 1B illustrate example ToF measurement systems and related components in lidar applications in accordance with some embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by raster scanning light emission (continuously) over a field of view or scene, for example, using a point scan or line scan to emit the necessary power per point and sequentially scan to reconstruct the full FoV.

In embodiments described herein, a detection window or strobe window may refer to the respective durations of activation and deactivation of one or more detectors (e.g., responsive to respective detector time gates/control signals from a control circuit) over a temporal period or time between pulses of the emitter(s) (which may likewise be responsive to respective emitter control signals from a control circuit). The relative timings and durations of the respective detection windows may be controlled by respective strobe signals (Strobe<i>) as described herein, in which case the detection windows may be referred to as strobe windows.

In imaging applications (such as lidar) that use ToF sensors based on detection of incident photons that have been reflected from a target, the target that is to be resolved may have high or low reflectivity at any distance within the target range, in a wide range of ambient light conditions. The ToF sensor may require high dynamic range in order to be able to detect or sense a sufficient number of signal photons (corresponding to the optical signals output from the emitter array; as opposed to background photons corresponding to the ambient light) to be able to resolve the target. For example, targets with low reflectivity at long distance in high ambient light may be more challenging to resolve, as these targets may require more time (e.g., more laser cycles) to accumulate signal photons. In contrast, targets at near distance may provide more returned signal photons, and may thus require less time (e.g., fewer laser cycles) to accumulate enough signal photons to resolve a distance measurement.

Some embodiments described herein may arise from realization that, if the effective readout rate of a ToF sensor is fixed to a readout rate that may be required for imaging farther targets (or, more generally, set to a value corresponding to the minimum frame rate for a target at a particular distance range), there may be some instances in which readout operations may be performed without accumulating enough signal photons to accurately resolve the target (i.e., too soon), and/or readout operations may be performed at a rate that is not fast enough for higher signal photon returns (i.e., too slow), for example, as may be encountered when mounted in a moving vehicle. In particular, it may beneficial to have a variable readout rate that is higher (i.e., more frequent, based on fewer samples or emitter cycles) for nearer targets, as these targets are closer to the moving vehicle.

Embodiments of the present disclosure are directed to arrays of single-photon detectors and associated processing/control circuit(s) that implement a ToF pixel with a variable, signal-dependent readout rate. In particular, some embodiments provide signal dependent effective-readout rate ToF sensor including ToF measurement circuits that continue to sample (non-destructively readout) each pixel of a detector array, that is, by continuing to accumulate or count photons after or independent of a fixed time window or frame without resetting the accumulated count value (also referred to herein as resetting the pixel) until a sufficient or predetermined signal ratio is achieved. For example, some embodiments may perform operations to output a readout signal (also referred to herein as readout operations, or readouts) based on a detection threshold (e.g., a threshold number of detection events), such that the number of readouts per subframe may vary based on target range and/or reflectivity. Embodiments of the present disclosure may allow for more frequent readouts or higher readout rates per subframe for closer or more reflective targets (with fewer emitter cycles and data samples per readout, which may reduce pixel saturation), and less frequent readouts or lower readout rates per subframe for farther or less reflective targets (with more emitter cycles and data samples per readout, which may reduce pixel noise).

The detection threshold may be a threshold number of detection events (also referred to herein with reference to a threshold count value, such as a threshold photon count value) and may be electronically varied based on detected environmental and/or other operating conditions (e.g., based on the range and/or reflectivity of the target being imaged). Operations may be performed at the pixel level or "in-pixel" (e.g., with each detector including or providing outputs to dedicated circuits, such as storage and/or logic circuits (including correlator, counter, and/or time integrator logic), which are not shared with other pixels). In particular embodiments, each detector pixel of the detector array may be continuously non-destructively sampled or scanned (e.g., responsive to a clock signal), but the control circuit(s) may be configured to provide an output or readout (e.g., a read voltage) and reset the photodiodes in response to a signal (also referred to herein as a flag signal or "flag") indicating that the threshold number of detection events have been detected.

For example, the detection signals output from the detectors may be sampled (e.g., periodically, responsive to a clock signal) during a first detection window corresponding to a particular distance sub-range (i.e., a portion of the overall imaging distance range of the ToF sensor). The frequency of the clock signal or sampling may allow multiple samples of the detection signals over each detection window. The first detection window may be repeated (e.g. over multiple emitter cycles, without resetting the counted detection events) until a threshold number of detection events have been detected. At this time, a readout operation may be performed (and associated with the subframe corresponding to the particular distance sub-range) and the detection event count may be reset before sampling the next set of detection signals. An image frame may be defined when readout operations have been performed for all strobe windows for the overall imaging distance range of the sensor, that is, when data for all subframes (and thus, all distance sub-ranges of the imaging distance range) have been collected.

The number of readouts (and thus collected data) per subframe may vary based on a number of photons (or more generally, detection events) that have been detected. For example, a first subframe (e.g., corresponding to a closer distance subrange with more photon returns) may include more readouts, each representing data collected for fewer laser cycles, while a second subframe (e.g., corresponding to a farther distance subrange with fewer photon returns) may include fewer readouts, each representing data collected for more laser cycles. In some embodiments, the readout rate may vary on a per-pixel basis; for example, pixels positioned at peripheral-facing portions of a detector array may be operated with different readout rates than pixels positioned at central-facing portions of the detector array.

In some embodiments, the detectors may be sampled many times during each strobe window, at a rate greater than may be necessary to provide a minimum desired frame rate, referred to herein as oversampling. That is, the detectors may be oversampled at a rate that is N times higher than a minimum required frame rate for a target at a particular distance range. In some embodiments, each pixel of the detector array may be configured to output a respective flag signal indicating a voltage (or digital code or digital "1") that relates to the number of photon counts that have been received by the pixel. For example, a detector pixel including a counter circuit associated with a respective detector element may be configured to generate and output the flag for that pixel based on a threshold indicating detection of a preset number of photons. This flag may be used to indicate when a pixel should be readout (e.g., to output detection data for a subframe) and reset, or left to continue accumulating counts (even beyond an end of a predetermined duration). The threshold used to generate the flag can be programmable, for example, based on real-time other operating conditions, such as range (e.g., the distance range of the target) and/or target reflectivity. A feedback signal indicative of the real-time operating conditions may be provided by the detector array itself, and/or other detector(s).

Some embodiments of the present disclosure may provide circuits that operate according to a "rolling-shutter" (rather than an event-driven) scheme, where the detector(s) defining each pixel can continue to gather photons until receipt of a flag signal indicating that a threshold number of detection events (e.g., a threshold number of photons) have been detected, and readout is performed sequentially (e.g., row-by-row or column-by-column). For example, a single flag signal may be combined with a rolling readout such that a circuit processes the voltages on the read lines only if the flag signal is set (i.e., transitions from low/"0" to high/"1"). Such a rolling readout-based scheme may differ from event-driven schemes, which typically require an arbitrated row-column architecture to ensure that data is not lost. Embodiments of the present disclosure may also be advantageous as compared with performing respective read operations at the end of each frame and adding the outputs, in that each read operation may involve some amount of read noise, which can overwhelm output signals indicating detected signal photons for dimmer targets (e.g., when only a small number of reflected signal photons have been detected by the end of the fixed frame). Quantization noise in analog-to-digital conversion may also be a factor when performing such multiple read operations.

Figure 1B:
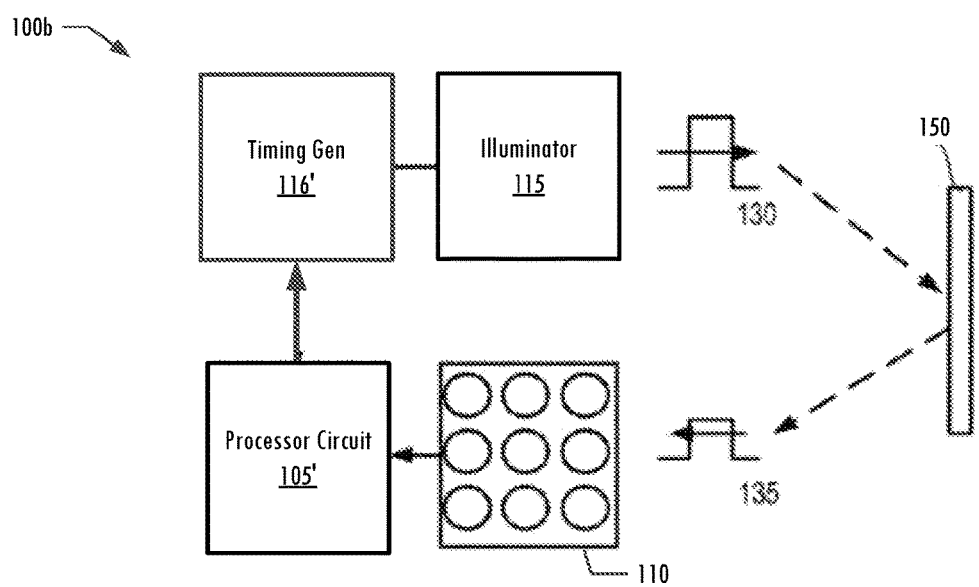

FIGS. 1A and 1B illustrate example ToF measurement systems 100a and 100b and related components in LIDAR applications in accordance with some embodiments of the present disclosure. As shown in FIG. 1A, the system 100a includes a control circuit 105, a timing circuit 106, an illumination source (illustrated as an emitter array 115 including a plurality of emitter elements or emitters 115e), and a detector array 110 including a plurality of detector elements or detectors 110d. Each detector 110d may represent a photodetector (e.g., a photodiode), and one or more detectors 110d may define a respective detector pixel of the detector array 110. One or more emitters 115e of the emitter array 115 may define emitter units that respectively emit a radiation pulse or continuous wave signal (for example, through a diffuser or optical filter 114) at a time and repetition rate controlled by a timing generator or driver circuit 116. In particular embodiments, the emitters 115e may be pulsed light sources, such as LEDs or lasers (such as vertical cavity surface emitting lasers (VCSELs) and/or edge-emitting lasers).

In some embodiments, an emitter module or circuit may include the array 115 of emitter elements 115e, a corresponding array of optical elements 113, 114 coupled to one or more of the emitter elements (e.g., lens(es) 113 (such as microlenses) and/or diffusers 114), and the driver circuit 116. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit 116 may include one or more driver transistors configured to control the pulse repetition rate, timing and amplitude of the optical emission signals that are output from the emitters 115e.

In some embodiments, a detector module or circuit includes the array 110 of detectors 110d, receiver optics 112 (e.g., one or more lenses to collect light over the FoV 190 of the array 110), and receiver electronics (including timing circuit 106) that are configured to power, enable, and disable all or parts of the detector array 110 and to provide respective timing signals thereto, for example, to define respective frame rates. The receiver optics 112 may include a macro lens that is configured to collect light from the largest FoV that can be imaged by the LIDAR system, a spectral filter 111 to pass or allow passage of a sufficiently high portion of the 'signal' light (i.e., light of wavelengths corresponding to those of the optical signals output from the emitters) but substantially reject or prevent passage of non-signal or 'background' light (i.e., light of wavelengths different than the optical signals output from the emitters), microlenses to improve the collection efficiency of the detector pixels, and/or anti-reflective coating to reduce or prevent detection of stray light. The detector array 110 includes time-of-flight sensors (for example, an array of single-photon detectors, such as Geiger-mode avalanche diodes (e.g., SPADs).

The timing circuit 106 may control the timing and gain/sensitivity of the detector array 110. The timing circuit 106 for the detector array 110 may be phase-locked to the driver circuit 116 of the emitter array 115 in some embodiments. The timing circuit 106 may also control the sensitivity of each of the detectors 110d, or of groups of detectors 110d defining a detector pixel. For example, when a detector pixel includes one or more reverse-biased Geiger-mode photodiodes (e.g., SPADs) 110d, the reverse bias applied to each photodiode 110d of the detector pixel may be adjusted (e.g., based on a voltage differential of the electrodes 107 described herein), whereby, the higher the overbias, the higher the sensitivity. The detectors 110d can be activated or deactivated with at least nanosecond precision, and may be individually addressable, addressable by group, and/or globally addressable.

As shown in FIG. 1A, light emission output from one or more of the emitters 115e of the emitter array 115 impinges on and is reflected by one or more targets 150, and the reflected light is detected as an echo signal by one or more of the detectors 110d of the detector array 110, converted into electrical signal representations (referred to herein as a detection signals), and processed (e.g., based on time of flight) to define a 3-D point cloud representation 170 of the scene within the field of view 190. Operations of LIDAR systems in accordance with embodiments of the present disclosure as described herein may be performed by one or more processors or controllers, such as the control circuit 105 of FIG. 1A or a processor circuit 105' of FIG. 1B.

FIG. 1B further illustrates components of a ToF measurement system or circuit 100b in a LIDAR application in accordance with some embodiments described herein. The circuit 100b may include a processor circuit 105' (such as a digital signal processor (DSP)), a timing generator 116' which controls timing of the illumination source (illustrated by way of example with reference to a laser emitter array 115), and an array of single-photon detectors (illustrated by way of example with reference to a single-photon detector array 110). The processor circuit 105' may include a sequencer circuit that is configured to coordinate operation of the emitters 115e and detectors 110d. The processor circuit 105' may also control memory storage operations for storing data indicated by the detection signals in a non-transitory memory or memory array that is included therein or is distinct therefrom.

The processor circuit 105' and the timing generator 116' may implement some of the operations of the control circuit 105 and the driver circuit 116 of FIG. 1A. The laser emitter array 115 emits a laser pulse 130 at a time controlled by the timing generator 116'. Light 135 from the laser pulse 130 is reflected back from a target (illustrated by way of example as object 150), and is sensed by single-photon detector array 110. The processor circuit 105' implements a pixel processor that measures the ToF of the laser pulse 130 and its reflected signal 135 over the journey from emitter array 115 to object 150 and back to the single-photon detector array 110.

The control circuit 105/processor circuit 105' may provide analog and/or digital implementations of logic circuits that provide the necessary timing signals (such as quenching and gating or strobe signals) to control operation of the single-photon detectors of the array 110 and process the detection signals output therefrom. For example, the single-photon detectors of the array 110 may generate detection signals in response to incident photons only during short gating intervals or time gates (i.e., the strobe windows) that are defined by the strobe signals. Photons that are incident outside the detection/strobe windows have no effect on the outputs of the single photon detectors.

The control circuit 105/processor circuit 105' may be configured to operate responsive to detection events (e.g., detected photons in the reflected radiation) by implementing counter and integration circuits in accordance with embodiments described herein. The counter and integration circuits are operable to count detected photons and integrate information representing the individual times of arrivals of the detected photons, respectively, in response to the output(s) of one or more detectors. The counter and integration circuits may also be referred to herein as photon counter or counting circuits and time or timestamp integration circuits, respectively. The control circuit 105/processor circuit 105' may be configured to calculate an estimated time of arrival of the burst of photons based on a ratio of the integration signal output from the integration circuit (e.g., representing the time integration or summation of the time stamps associated with the times of arrival of the photons) and the counter signal output from the counter circuit (e.g., representing the count of the detection events), based on the detection signals output from respective photodetectors 110d in the detector array 110.

Some embodiments of the present disclosure may provide circuits that are configured to readout the output from both a counter circuit (e.g., a photon count voltage) and a timestamp integration circuit (e.g., an accumulated set of timestamps) for ToF sensing responsive to detecting the threshold number of detection events. For example, some embodiments may provide circuits that include a comparator in or associated with a respective column (e.g., instead of in each detector pixel), and may be configured to readout the count voltage and compare the count voltage to a voltage threshold (also referred to herein as Vref). If the threshold is exceeded, the count voltage is converted via the n-bit analog-to-digital converter (ADC) (when n>2), and the second time-stamp column is also converted. In contrast, some conventional approaches for high dynamic range imaging may read out only a count voltage or value. Additional or alternative embodiments may provide a digital architecture that uses a digital code as a count threshold to set the flag for readout of accumulated timestamps and count value.

In the examples described herein, each detector pixel may include or be associated with a respective counter circuit (analog or digital) that is configured to output a respective flag signal responsive to the number of photon counts that have been detected by the detector pixel exceeding a (preset or programmable) detection threshold. A control circuit may thus determine that a detector pixel should be readout and reset, or left to continue accumulating counts based on the flag signal. The threshold used to generate the flag may be variable and/or programmable, for example, based on a distance range and/or reflectivity of the target. The counter circuits and/or time integration circuits described hereinafter with respect to FIGS. 2-4 may be implemented in whole or in part by the control circuit 105 and/or the processor circuit 105' of FIGS. 1A and 1B in accordance with various embodiments of the present disclosure.

Figure 2:
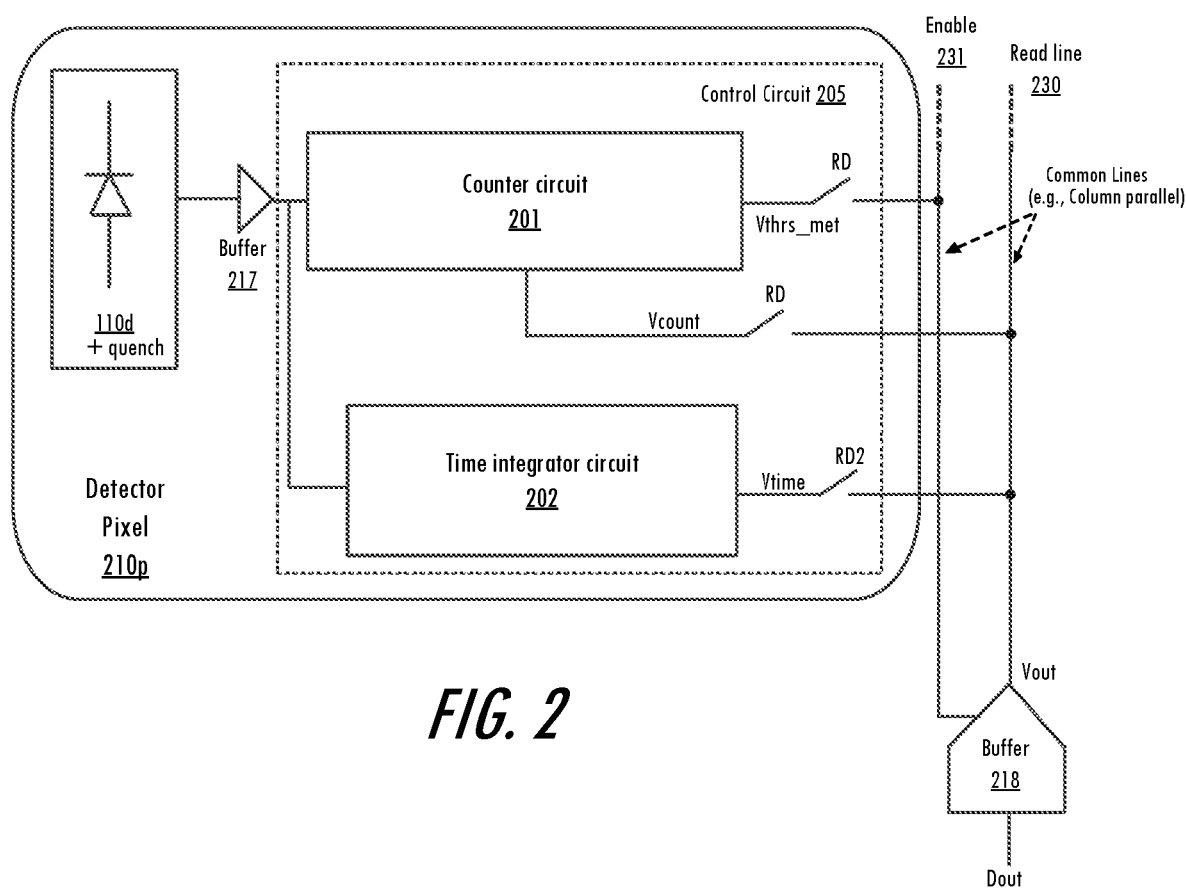
FIG. 2 is a block diagram illustrating a ToF detector pixel including threshold-based readout of counter and time integration circuits in accordance with some embodiments of the present disclosure.
Figure 3:
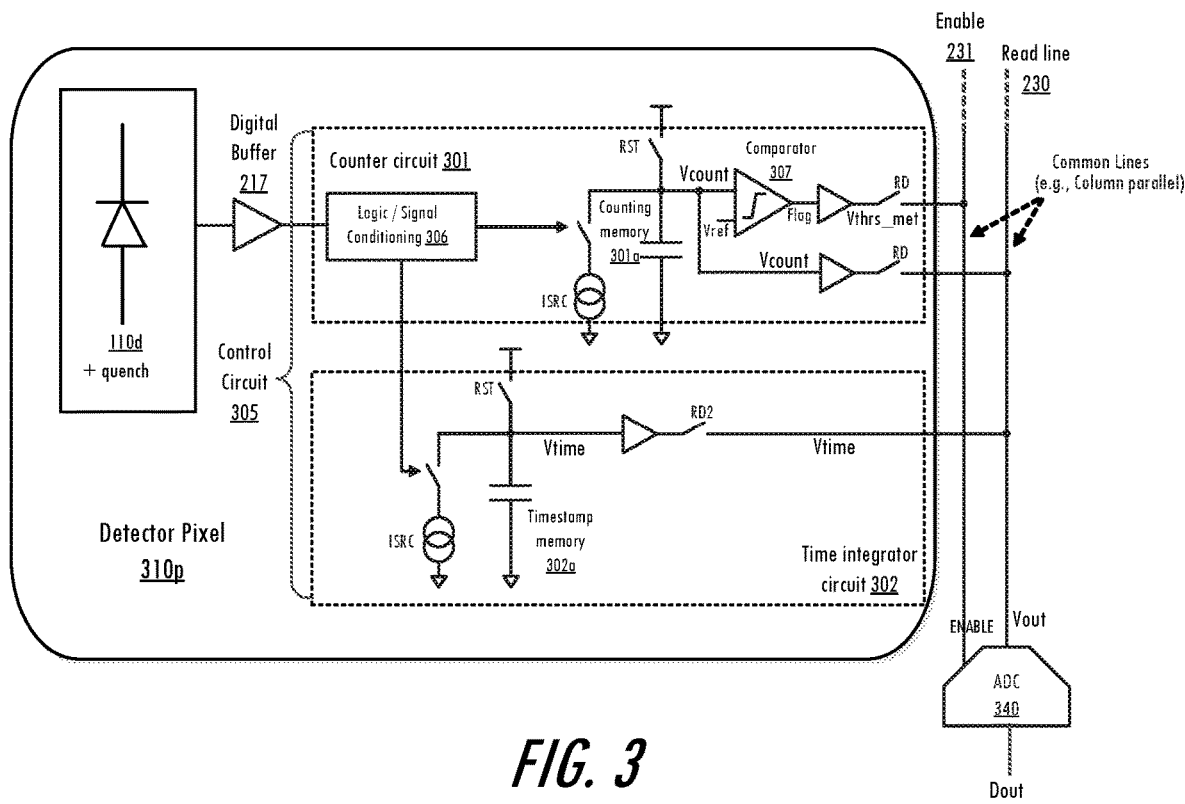
FIG. 3 is a block diagram illustrating a ToF detector pixel including analog implementations of counter and time integration circuits in accordance with some embodiments of the present disclosure.
Figure 4:
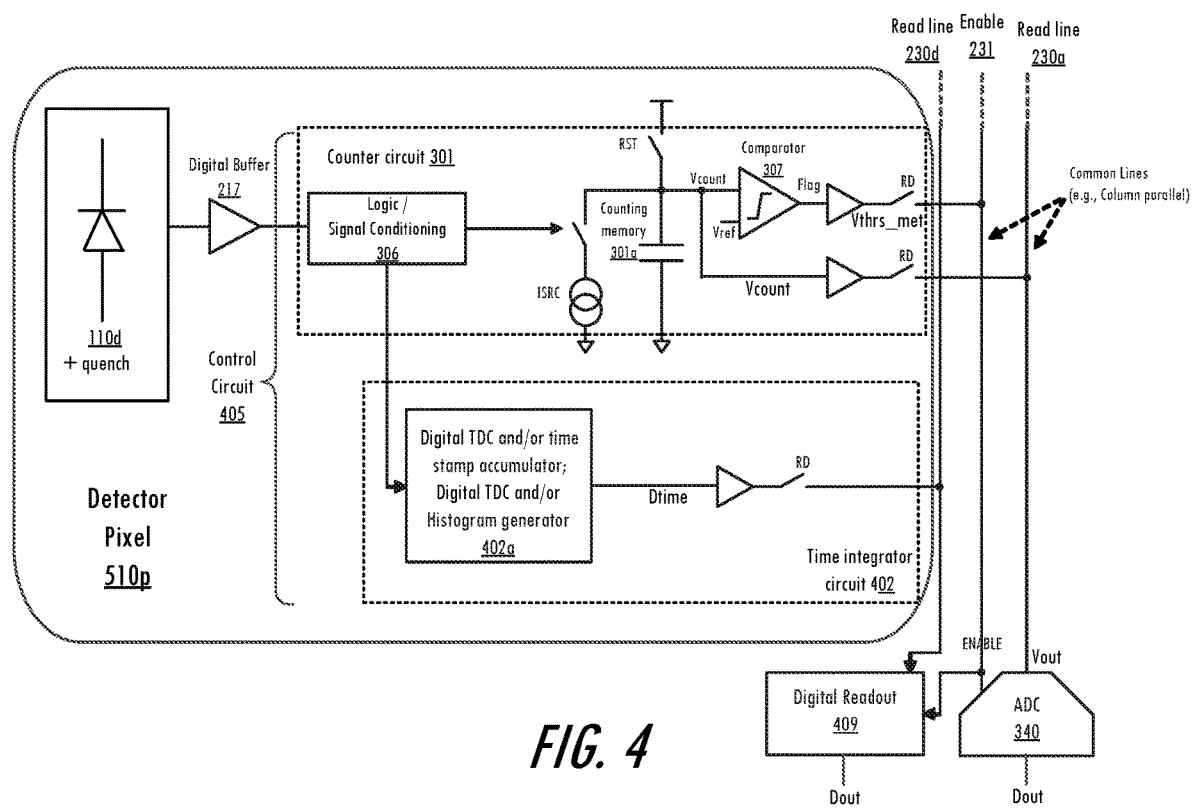
FIG. 4 is a block diagram illustrating a ToF detector pixel including analog implementation of a counter and digital implementation of a time integration circuit in accordance with some embodiments of the present disclosure.
Figure 5:
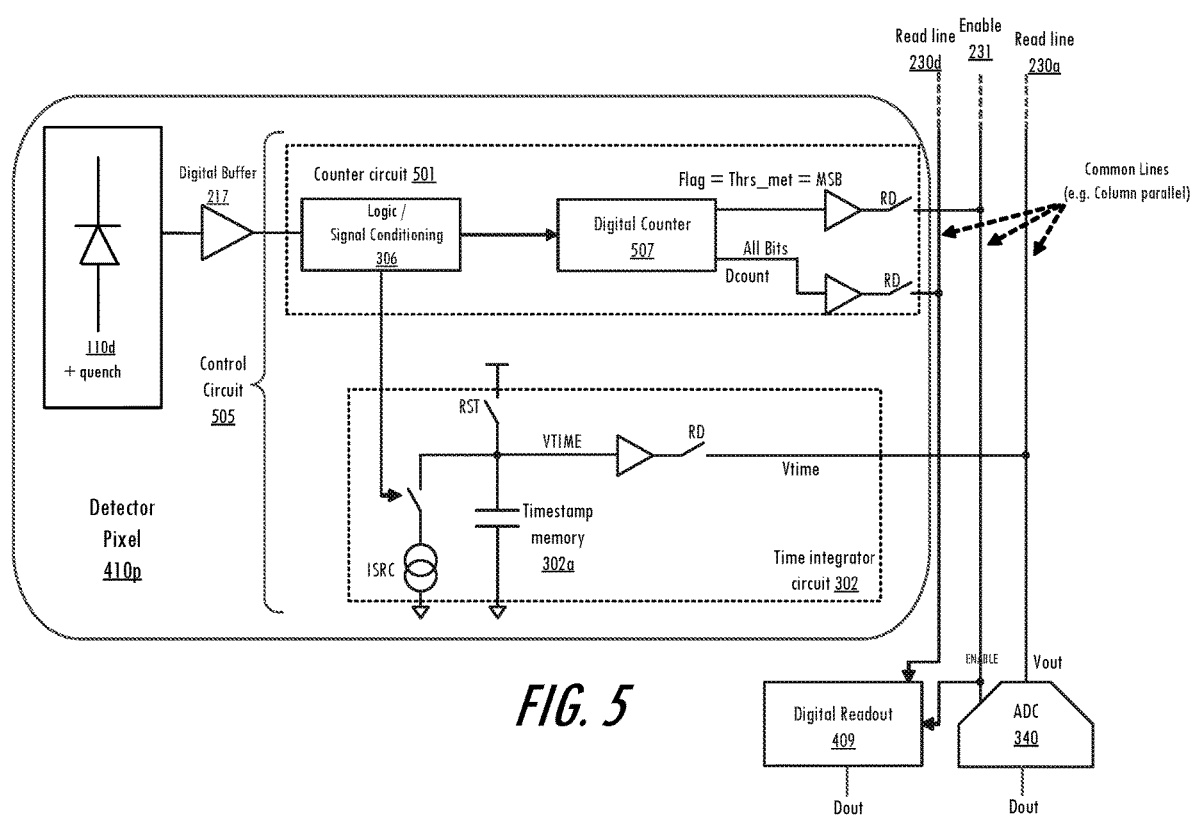
FIG. 5 is a block diagram illustrating a ToF detector pixel including a digital implementation of a counter circuit and an analog implementation of a time integration circuit in accordance with some embodiments of the present disclosure.

FIGS. 2-4 are block diagrams of LIDAR detector pixels and associated control circuits (in in-pixel configurations) that may be used in ToF measurement circuits and systems according to some embodiments of the present disclosure. For example, the LIDAR detector pixel embodiments described with respect to FIGS. 2-4 may be implemented by the circuits 105/105' and detector arrays 110 in the ToF measurement systems 100a and 100b of FIGS. 1A and 1B. FIG. 5 is a waveform diagram illustrating operations that may be performed by the control circuits of FIGS. 2-4.

Referring now to FIG. 2, a LIDAR detector pixel 210p includes a control circuit 205 coupled to the output of a detector element 110d (e.g., a single photon detector, such as a SPAD) to receive detection signals output from the detector element 110d in response to photons incident thereon during a detection window. The detector pixel 210p may represent one of a plurality of detector pixels of a detector array, such as the detector array 110 of FIGS. 1A and 1B. A buffer 217 may store output signals from the detector 110d, e.g., detection signals, which are provided as inputs to a counter circuit 201 and a time integration circuit 202 of the control circuit. The counter circuit 201 may be an analog or digital counter circuit. Likewise, the time integration circuit 202 may be an analog or digital time integration circuit. In some embodiments, the buffer 217 may be an active circuit used during readout to provide analog voltages to the circuits 201 and/or 202 for storage (e.g., on respective capacitors).

In the example shown in FIG. 2, the counter circuit 201 is configured to receive the detection signals output from the detector 110d over one or more cycles of an emitter signal, and output a count signal Vcount representing a number of detection events indicated by the detection signals. For example, where the detector 110d is a single photon detector such as a SPAD, the counter circuit 201 implements a photon counter circuit that is configured to increment the count signal Vcount responsive to each photon detected by the detector 110d.

The time integration circuit 202 is also configured to receive the detection signals output from the detector 110d over one or more cycles of an emitter signal, and output a time integration signal Vtime representing respective times of the detection events (e.g., representing the time integration or summation of the time stamps associated with the times of arrival detected by a single-photon detector). A readout signal Vout (for analog signals) or Dout (for digital signals, e.g., where the voltage Vout is converted to Dout by an ADC) provided by the detector pixel 210p may include the count signal Vcount and/or the time integration signal Vtime (depending on serial or parallel outputs), and thus, may be used to calculate an estimated time of arrival of the burst of photons based on a ratio of the time integration signal Vtime output from the time integration circuit 202 and the counter signal Vcount output from the counter circuit 201.

The control circuit 205 is configured to output the signal Vout from the detector pixel 210p on a read line 230 (e.g., a column-parallel line) responsive to a varying number of cycles of the emitter signal, depending on reflection of the emitter signals from targets in the FoV. In particular, the counter circuit 201 is configured to generate and output a flag signal Vthrs_met responsive to detection events (e.g., photon counts) indicated by the count signal Vcount exceeding a threshold Vref (e.g., a threshold photon count value). That is, if the count signal Vcount is greater than the threshold Vref, the counter circuit 201 is configured to set (i.e., transition from low/logic"0" to high/logic"1") the flag signal Vthrs_met, indicating that a sufficient number of photons have been detected to calculate a time of arrival for a burst of photons. The counter circuit 201 and the time integration circuit 202 are thus configured to output the count signal Vcount or the time integration signal Vtime, respectively, as the readout signal Dout in response to the flag signal Vthrs_met indicating a sufficient signal ratio for estimation of ToF, rather than based on a predetermined number of cycles of the emitter signal.

As such, some readout signals Dout may be output based on fewer cycles of the emitter signal than others. For example the readout signal Dout may be output more frequently (and thus, based on fewer emitter cycles) responsive to detection signals indicating closer and/or more reflective targets, as the desired signal ratio may be achieved more quickly in response to the greater number of reflected photons from such closer/more reflective targets (e.g., as indicated by the count signal Vcount exceeding the threshold Vref responsive to a smaller number of emitter cycles). Conversely, the readout signal may be output less frequently (and thus, based on more emitter cycles) responsive to detection signals indicating farther and/or less reflective targets, as the desired signal ratio may be achieved more slowly in response to the lesser number of reflected photons from such farther/less reflective targets (e.g., as indicated by the count signal Vcount exceeding the threshold Vref responsive to a greater number of emitter cycles).

The counter circuit 201 and the time integration circuit 202 are also configured to reset the count signal Vcount and the time integration signal Vtime, respectively, responsive to the flag signal Vthrs_met. In the absence of the flag signal Vthrs_met, the counter circuit 201 and the time integration circuit 202 are configured to continue to count the detection events and integrate the respective times of arrival indicated by the detection signals (without resetting the values of Vcount and Vtime), respectively, until a predetermined time limit. For example, in some embodiments the control circuit 205 may be configured to force the output of the readout signal Dout if the flag signal Vthrs_met is not generated after a predetermined number of emitter cycles, to ensure a minimum desired frame rate.

In the example of FIG. 2, the control circuit 205 is configured to output the signal Vout responsive to receiving the flag signal Vthrs_met in combination with a read signal RD, RD2. In particular, the signal Vcount or Vtime is output to the read line 230 in response to the read signal RD or RD2, respectively, and the flag signal Vthrs_met is output to an enable line 231 and used as an enable signal for a tri-state buffer 218 that is configured to output the readout signal Dout from the detector pixel 210p.

The read signal RD, RD2 can be sequentially applied to respective rows or columns of the detector array, for example, row-by-row or column-by-column, according to a rolling shutter scheme. FIG. 2 illustrates a multiplexed readout scheme (where the count signal Vcount and the time integration signal Vtime are serially output on the read line 230 in response to a sequentially applied first and second read signals RD and RD2, respectively), but it will be understood that in some embodiments a parallel readout scheme may be used (where the count signal Vcount and the time integration signal Vtime are output in parallel on respective read lines in response to the first and second read signals RD and RD2, respectively). That is, the flag signal Vthrs_met may be used with a rolling readout scheme such that the detector pixel 210p outputs the readout signal Dout only when its row (or column) is selected by the read signal RD, RD2, and the flag signal Vthrs_met is set.

In some embodiments, the control circuit 205 may include multiple memory storage devices in order to implement multi-stage operations to output the readout signal Dout responsive to multiple signals (e.g., Vthresh_met and RD/RD2). For example, the control circuit 205 may include a counting memory (e.g., a counting capacitor) that is configured store data indicated by the detection events, and a readout memory (e.g., a readout capacitor) that is coupled to the read line 230. In some embodiments, the readout capacitor may be coupled between the counting capacitor and the read line by a source follower circuit. In response to the flag signal Vthrs_met, the control circuit 205 may reset the counting memory and store the data indicated by the detection events in the readout memory. In response to the read signal RD/RD2, the control circuit 205 may output the readout signal Dout based on the data stored in the readout memory. As such, the counting memory may be decoupled from the readout memory to implement global shutter-like operation.

FIG. 3 illustrates a LIDAR detector pixel 310p in accordance with some embodiments, which includes analog implementations of both a counter circuit 301 and a time integration circuit 302. The LIDAR detector pixel 310p may otherwise perform operations similar to that described above with reference to the LIDAR detector pixel 210p of FIG. 2.

Referring now to FIG. 3, the LIDAR detector pixel 310p includes a control circuit 305 coupled to the output of a detector element 110d (e.g., a single photon detector, such as a SPAD), and may represent one of a plurality of detector pixels of a detector array, such as the detector array 110 of FIGS. 1A and 1B. A buffer 217 may provide analog voltages to the circuits 301 and/or 302 for storage (e.g., on respective capacitors 301a, 302a).

The counter circuit 301 is an analog circuit configured to receive the detection signals output from the detector 110d over one or more cycles of an emitter signal, and output a count signal Vcount representing a number of detection events indicated by the detection signals. For example, where the detector 110d is a single photon detector such as a SPAD, the counter circuit 301 implements a photon counter circuit that is configured to increment the count signal Vcount responsive to each photon detected by the detector 110d. The time integration circuit 302 is an analog circuit that is also configured to receive the detection signals output from the detector 110d over one or more cycles of an emitter signal, and output a time integration signal Vtime representing respective times of the detection events (e.g., representing the integrated times of photon arrivals detected by a single-photon detector).

As shown in FIG. 3, the counter circuit 301 includes a counting memory (illustrated as a counting capacitor 301a) that is configured to be charged responsive to each detection event by the detector 110d. Similarly, the time integration circuit 302 includes a timestamp memory (illustrated as an integrating capacitor 302a) that is configured to be charged responsive to each detection event. In particular, each of the counter circuit 301 and the time integration circuit 302 includes a respective independent current source ISRC, which is configured to be switched to charge the respective capacitors 301a, 302a responsive to an output of a logic/signal conditioning circuit 306 that receives the buffered detection signals at the output of the buffer 217. For example, the time integration circuit 302 may include a TAC circuit implemented by the logic/signal conditioning circuit 306, current source ISRC, and a Charge Transfer Amplifier (CTA) circuit, where the logic/signal conditioning circuit 306 operates a switch so as to connect the current source ISRC to the CTA circuit.

The counter circuit 301 includes a comparator 307 that is configured to compare the voltage Vcount on the counting capacitor 301a with a threshold voltage Vref. If the voltage value of the count signal Vcount is greater than the threshold voltage value Vref, the counter circuit is configured to set and output a flag signal Vthrs_met on the enable line 231, indicating that sufficient photons have been detected to calculate a time of arrival for a burst of photons. Read signals RD, RD2 may be provided, for example, according to a rolling shutter scheme, to output the signals Vcount and Vtime to a read line 230.

More particularly, in the example of FIG. 3, the flag signal Vthrs_met is used as an enable signal for an analog-to-digital converter (ADC) 340 in a column-parallel arrangement. The flag signal Vthrs_met can be used to either initiate an analog to digital conversion of the voltage on the read line 230 by the ADC 340, or to leave the ADC 340 in a standby state, based on the value (low/logic"0" or high/logic"1") of the flag signal Vthrs_met. If the flag signal Vthrs_met is set, the voltage value represented by the count signal Vcount is converted to a digital value by the ADC 340 responsive to the read signal RD and output as a readout signal Dout. Subsequently (or concurrently, if parallel read lines are present), the voltage value represented by the time integration signal Vtime is converted to a digital value responsive to the read signal RD2 and output as a readout signal Dout. The pixel 310p may be configured to output the flag signal Vthrs_met along with the data Dout (e.g., off-chip) after or in response to a "1" flag, and to ignore the signal Vout on the read line 230 after or in response to a "0" flag. The signal Vout is thus only converted by the ADC 340 in response to both the flag signal Vthrs_met (indicating the threshold number of detection events have been met; also referred to herein as a valid conversion) and the read signal RD/RD2 (which can be applied sequentially (e.g., row-by-row) to multiplex access to the common read line 230 without the use of arbitration).

The control circuit 305 is thus configured to output a readout signal Dout (representing the count signal Vcount or the time integration signal Vtime) in response to the flag signal Vthrs_met indicating a sufficient signal ratio for estimation of ToF, rather than based on a predetermined number of cycles of the emitter signal. The counter circuit 301 and the time integration circuit 302 are also configured to generate respective reset signals RST responsive to the flag signal Vthrs_met, to reset the values of the count signal Vcount and the time integration signal Vtime stored on the capacitors 301a, 302a, respectively. In the absence of the flag signal Vthrs_met, the counter circuit 301 and the time integration circuit 302 are configured to continue to count the detection events and integrate the respective times of arrival indicated by the detection signals (without resetting the values of Vcount and Vtime), respectively, up to a predetermined time limit (e.g., a number of emitter cycles corresponding to a minimum desired frame rate).

Although illustrated as being generated based on a comparator 307 in the detector pixel 310p, it will be understood that the flag signal Vthrs_met can be generated by a comparator that is outside the pixel 310p once the count signal Vcount is activated on the common bus or read line 230 in response to the read signal RD. For example, instead of the in-pixel comparator 307, some embodiments may include a comparator for each column, and the control circuit 305 may monitor the value of the count signal Vcount and generate the flag signal to output Vcount (and/or Vtime) to the ADC 340 if the value of Vcount is above the threshold value Vref. As such, rather than one comparator per pixel, a comparator per column (or row) may be used to reduce area requirements.

The control circuit 305 is thus configured to output the readout signal Dout from the detector pixel 310p responsive to a varying number of cycles of the emitter signal. While a single ADC 340 is illustrated for converting the count signal Vcount and the time integration signal Vtime sequentially (by multiplexing both onto the read line 230 in response to the read signals RD and RD2, respectively), it will be understood that the ADC 340 may be implemented by multiple ADCs (one for Vtime and one for Vcount) in a parallel column arrangement in some embodiments. That is, the count signal Vcount and the time integration signal Vtime can be output in parallel on respective read lines in response to one read signal RD, with one dedicated ADC per read line.

While illustrated as analog circuits 301 and 302 in FIG. 3, it will be understood that digital implementations of the circuits 301 and/or 302 may be used in some embodiments. Some digital implementations may require greater complexity, in that the counting capacitor 301a of the analog counter 301 (and/or the integrating capacitor 302b of the analog integrator 302) may be replaced by multiple transistors, which may require greater power consumption. Also, some digital implementations may require routing of more bits per column to achieve high dynamic range.

FIG. 4 illustrates a hybrid implementation of a LIDAR detector pixel 410p in accordance with some embodiments, including an analog implementation of the counter circuit in combination with a digital implementation of the time integration circuit. Referring now to FIG. 4, the LIDAR detector pixel 410p includes a control circuit 405 coupled to the output of a detector element 110d (e.g., a single photon detector, such as a SPAD), and may represent one of a plurality of detector pixels of a detector array, such as the detector array 110 of FIGS. 1A and 1B. The control circuit 405 includes an analog counter circuit 301 and a digital time integrator circuit 402.

Operation of the counter circuit 301 to generate and set the flag signal Vthrs_met and output the signal Vcount responsive to a varying number of cycles of the emitter signal may be similar to that described above with reference to FIG. 3. Inputs to and outputs from the time integration circuit 402 may likewise be similar to the time integration circuit described above with reference to FIG. 3. However, the time integration circuit 402 may be implemented as a digital circuit 402a, for example, using a time-to-digital converter (TDC; which may measure the time of arrival of photons) and/or a digital counter (e.g., a timestamp accumulator) to generate and output the time integration signal Dtime. Alternatively, the digital circuit 402a may include a TDC and/or a histogram generator to generate and output the time integration signal Dtime. The digital circuit 402a may, therefore, output signal Dtime, which may provide one or more bits of a digital representation of the time integration or time summation of the time stamps associated with the detection of one or more photons by the detector 110d.

In FIG. 4, the count signal Vcount and the time integration signal Dtime are output in parallel on read lines 230a and 230d, respectively, responsive to the read signal RD. The flag signal Vthrs_met acts as an enable for both the ADC 340 (to output the readout signal Dout representing the analog count signal) and a digital readout circuit 409 (to output the readout signal Dout representing the digital timestamp integration signal).

FIG. 5 a hybrid implementation of a LIDAR detector pixel 510p in accordance with some embodiments, including a digital implementation of the counter circuit in combination with an analog implementation of the time integration circuit. Digital counting embodiments (where a digital circuit 507 is used as the photon counter circuit 501) may operate in a manner similar to the analog counter circuit 301 described above, but potentially at a significantly higher readout rate, as digital values may be faster to stream from the array of detector pixels.

Referring now to FIG. 5, the LIDAR detector pixel 510p includes a control circuit 505 coupled to the output of a detector element 110d (e.g., a single photon detector, such as a SPAD), and may represent one of a plurality of detector pixels of a detector array, such as the detector array 110 of FIGS. 1A and 1B. The control circuit 505 includes digital counter circuit 501 and an analog time integrator circuit 302.

The counter circuit 501 is a digital circuit configured to receive the detection signals output from the detector 110d over one or more cycles of an emitter signal, and output a count signal Dcount representing a number of detection events indicated by the detection signals. For example, where the detector 110d is a single photon detector such as a SPAD, the counter circuit 501 includes a digital counter and/or a time-to-digital converter (TDC) to implement a photon counter circuit 507 for counting respective photon arrivals at the detector 110d.

The time integration circuit 302 is an analog circuit that is also configured to receive the detection signals output from the detector 110d over one or more cycles of an emitter signal, and output a time integration signal Vtime representing respective times of the detection events (e.g., representing the time integration or summation of the time stamps associated with the times of arrival detected by a single-photon detector). Operation of the time integration circuit 302 to generate and output the signal Vtime responsive to a varying number of cycles of the emitter signal may be similar to that described above with reference to FIG. 3.

As shown in FIG. 5, responsive to an output of a logic/signal conditioning circuit 306 that receives the buffered detection signals at the output of the buffer 217, the digital counter 507 is configured to compare the photon counts with a threshold value. If photon counts reaches or exceeds the threshold value, the counter circuit 501 is configured to generate a count signal Dcount digitally representing the number of photons that have been detected by the detector, and to set and output a digital flag signal Thrs_met, indicating that sufficient photons have been detected to calculate a time of arrival for a burst of photons. In FIG. 5, the most significant bit (MSB) of the count signal is used as the flag signal Thrs_met by way of example. However, it will be understood that any digital bit or code can be used in conjunction with an in-pixel digital comparator. For example, a 2-input AND gate with MSB and MSB-1 as inputs may be used. Also, the threshold value can be programmable per pixel, e.g., by using MSB, MSB-1 or any other bit or combination of bits as the flag signal Thrs_met.

In FIG. 5, the count signal Dcount and the time integration signal Vtime are output in parallel on read lines 230d and 230a, respectively, responsive to a read signal RD (e.g., according to a rolling shutter or rolling readout scheme). The flag signal Thrs_met acts as an enable for both the ADC 340 (to output the readout signal Dout representing the digital time integration signal) and a digital readout circuit 409 (to output the readout signal Dout representing the analog count signal). In particular, the setting of the flag signal Thrs_met indicates a valid conversion, and is output on the enable line 231 to enable the ADC 340 to convert the voltage value of the time integration signal VTIME to a digital value for output as readout signal Dout. The setting of the flag signal Thrs_met also indicates to the digital readout circuit 409 that the photon count value Dcount is valid for output as readout signal Dout. All bits of Dcount are provided on the common read line 230d connected to the digital readout logic circuit 409.

The digital counter circuit 501 and analog time integration circuit 302 implementation shown FIG. 5 may allow for simultaneous or parallel readout with only one ADC 340 per column, and may be less susceptible to noise involved in ADC operations. While the flag signal Thrs_met is generated in the pixel 510p in the example of FIG. 5, it will be understood that the flag signal Thrs_met can be generated by a comparator that is outside the pixel 510p in some embodiments. For example, the output Dcount from the digital counter 507 can be compared by off-pixel digital readout logic against a predefined threshold to output the flag signal Thrs_met on the enable line 231 to indicate to the ADC 340 that the conversion is valid and to indicate to the digital readout circuit 407 that the photon count Dcount is valid for readout.

Figure 6:
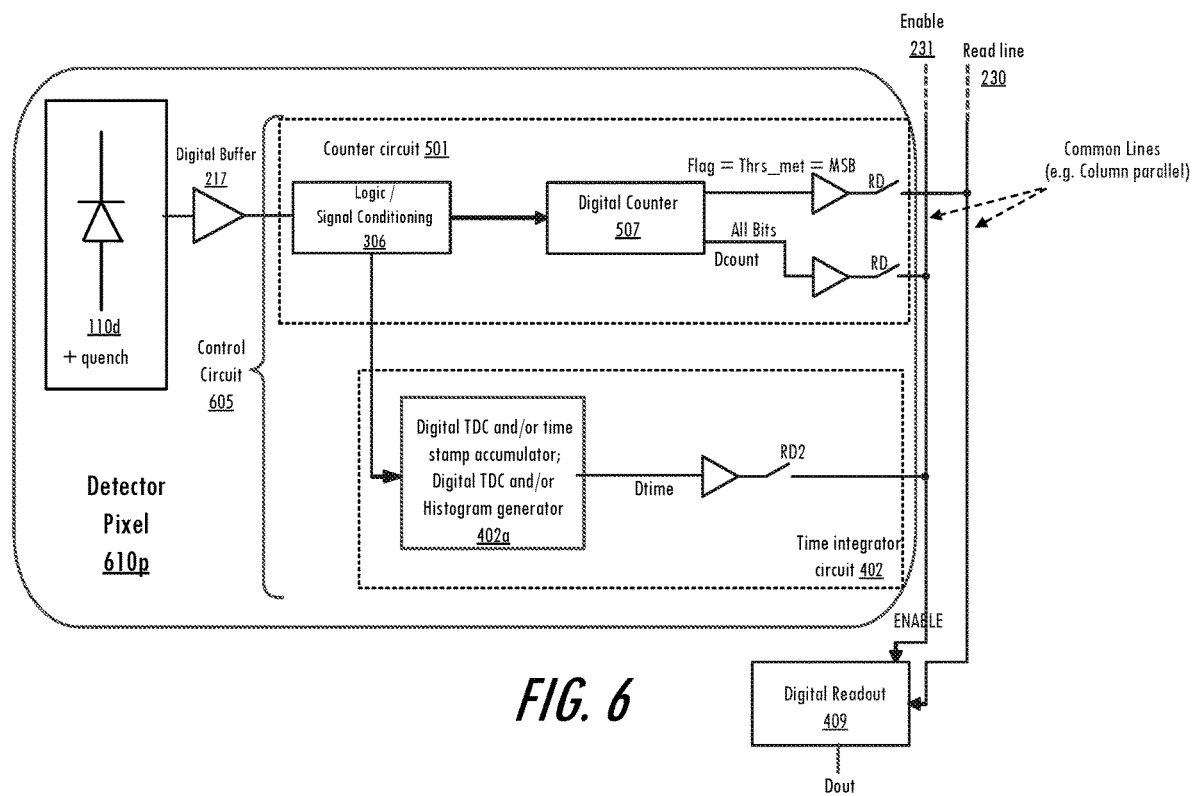
FIG. 6 is a block diagram illustrating a ToF detector pixel including digital implementations of counter and time integration circuits in accordance with some embodiments of the present disclosure.

FIG. 6 illustrates a LIDAR detector pixel 610p in accordance with some embodiments, including digital implementations of both the counter circuit and the time integration circuit. Referring now to FIG. 6, the detector pixel 410p includes a control circuit 605 coupled to the output of a detector element 110d (e.g., a single photon detector, such as a SPAD), and may represent one of a plurality of detector pixels of a detector array, such as the detector array 110 of FIGS. 1A and 1B. The control circuit 605 includes digital counter circuit 501 and a digital time integrator circuit 402. Operation of the counter circuit 501 to generate and output the flag signal Thrs_met and the count signal Dcount (to enable line 231 and read line 230, respectively) responsive to a varying number of cycles of the emitter signal may be similar to that described above with reference to FIG. 5. Operation of the time integration circuit 402 to generate and output the time integration signal Dtime responsive to a varying number of cycles of the emitter signal may be similar to that described above with reference to FIG. 4.

Similar to the embodiments of FIGS. 2 and 3, the common output line (read line 230) is shared between the photon count bits of the count signal Dcount and the photon time of arrival bits of the time integration signal Dtime, which are output on the read line using multiplexing in response to read signals RD and RD2, respectively (e.g., according to a rolling shutter or rolling readout scheme). However, in some embodiments, dedicated read lines may be for output of each set of bits (Dcount and Dtime) in parallel in response to one read signal RD. Also, similar to the embodiments of FIGS. 4 and 5, the digital readout circuit 409, the flag signal Thrs_met acts as an enable for a digital readout circuit 409 to output the readout signal Dout representing the digital count signal Dcount or the digital timestamp integration signal Dtime. The control circuit 605 is thus configured to output a readout signal Dout (representing the count signal Vcount or the time integration signal Vtime) in response to the flag signal Thrs_met indicating a sufficient signal ratio for estimation of ToF, rather than based on a predetermined number of cycles of the emitter signal.

In some embodiments, the photodetectors 110d may be oversampled, e.g., at rates of about 5 times to 10 times higher than a minimum required frame rate for a target at a particular distance range. In analog and/or hybrid detector pixel embodiments, such as shown in FIGS. 2-5, the oversampling may still be acceptable for the readout line-time of the ADC 340. For example, for a minimum frame rate of 30 frames per second (fps) and 20 time gates/subframes per frame, the subframe rate may be 20 time gates×30 fps=600 subframes per second. Oversampling the photodetectors 110d by 10 times would provide an effective subframe rate of 20 time gates×30 fps×10=6000 subframes per second. In this example, the resulting readout line time (ADCs top and bottom) may be 300/2×1/6000=1.11 µs (or 1.11 µs/2=0.55 µs if two readouts are needed, for the time integration and count signals, respectively). Such readout times may be comparable to those of multi-megapixel cameras (e.g., about 400 ns to 1.11 µs).

Figure 7:
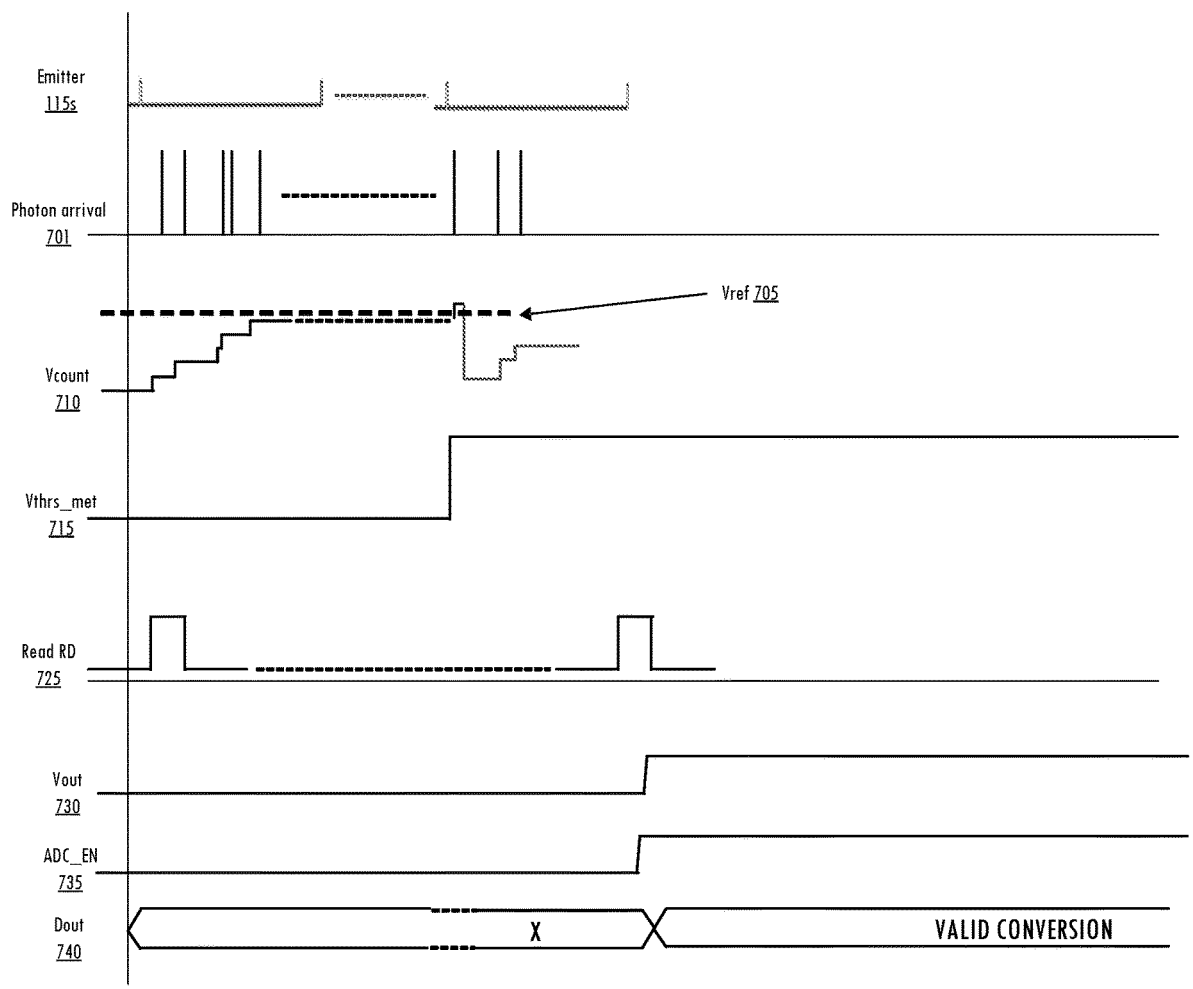
FIG. 7 is a waveform diagram illustrating operations of a ToF detector pixel according to some embodiments of the present disclosure.

An example timing diagram for operation of embodiments described herein is shown in FIG. 7. As shown in FIG. 7, for each photon arrival 701 detected by a detector pixel of a detector array (such as the detector pixel 210p of the detector array 110), the value of a count signal Vcount 710 is incremented by a counter circuit (such as the counter circuits 201, 301, 501) responsive to non-destructively sampling the detection signal output from the detector pixel during a detection window. The photon arrivals 701 may be detected over multiple cycles of the emitter signal 115s without resetting the value of the count signal Vcount 710.

The value of the count signal Vcount 710 is compared to a reference or threshold count value Vref 705. The threshold count value Vref 705 may be predetermined by a control circuit (such as the control circuit 105 and/or the processor circuit 105') and/or may be altered by the control circuit, for example, responsive to a feedback signal (e.g., from one or more detectors) indicative of real-time operating conditions. In some embodiments, the threshold count value Vref 705 may be varied among predetermined values corresponding to respective distance ranges and/or reflectivity values, which may be indicated by the feedback signal.

As shown in FIG. 7, when the value of the count signal Vcount 710 exceeds the threshold count value Vref 705, a flag signal Vthrs_met 715 is set (i.e., transitions from low/logic"0" to high/logic"1"). In some embodiments, the value of the count signal Vcount 710 may be reset and/or stored in a different memory (e.g., in a readout memory) in response to transition of the flag signal Vthrs_met 715 to the high state. Similarly, the value of the timestamp signal Vtime may be reset and/or may be stored a different memory in response to transition of the flag signal Vthrs_met 715 to the high state.

Still referring to FIG. 7, a read signal RD 725 is provided. In some embodiments, the read signal RD 725 may be provided according to a rolling-shutter-based readout scheme. For example, in an array of detector pixels, the read signal RD 725 may be provided to respective detector pixels row-by-row or column-by-column. The read signal RD 725 may be periodic in some embodiments. A readout operation is performed to output signal Dout responsive to both the read signal RD 725 and the flag signal Vthrs_met 715 having the high logic state.

In particular, when the value of Vcount 710 does not exceed the threshold count value Vref 705 (as illustrated for the first pulse of the read signal RD 725), the flag signal Vthrs_met 710 has a low state, and thus, a readout operation is not performed. When the value of Vcount 710 exceeds the threshold count value Vref 705 (as illustrated for the second pulse of the read signal 725), the flag signal Vthrs_met 715 has a high state, and thus, the signal Vout is provided to a read line. The signal Vout 730 may include the count value (e.g., from the counter circuit 201, 301, 401) or the integrated timestamp value (e.g., from the time integration circuit 202, 302), which may be output in parallel (e.g., responsive to the read signal RD 725) or serially (e.g., responsive to respective read signals RD and RD2).

The setting of the flag signal Vthrs_met 715 to the high state is used to trigger the output of an enable signal ADC EN 535 to the ADC, responsive to which the ADC converts the value of the signal Vout 530 to a digital signal and outputs signal Dout indicating a valid conversion (that is, that the signal Vout contains valid data above the detection threshold Vref 505). The readout voltage signal Vout is only converted by the ADC in response to both the flag signal Vthrs_met 515 (indicating the threshold number of detection events have been met) and the read signal RD, thereby avoiding data loss that may occur when multiple pixels reach the threshold number of detection events close in time without the use of an arbiter.

The number or rate of readouts of the signal Dout may thus be performed in response to varying numbers of cycles of the emitter signal 115s, depending on when sufficient data has been collected to perform estimation of the times of the photon arrivals 501. The number of readouts in each subframe may therefore vary as well, with some subframes (e.g., corresponding to closer distance subranges and/or including more reflective targets) containing more readouts than others. In some embodiments, all of the detector pixels of the array may be reset after the output of a subframe. That is, the beginning of each subframe may be global, with multiple readouts and resets per pixel in each subframe, with readouts being performed row-by-row (or column-by-column). Embodiments described herein can thus provide global acquisition with a rolling shutter.

The control circuits described herein may be configured to set the reference or threshold value Vfref according to operating and/or environmental conditions. In some embodiments, the control circuits may be configured to set Vfref globally, that is, to a common value for a group of detector pixels, or for all detector pixels in the detector array 110. In some embodiments, the control circuits may be configured to set Vfref dynamically, for example, based on real-time changes in ambient light and/or other environmental conditions. For example, the detector array 110 and/or other sensor(s) may provide a feedback signal indicative of one or more external conditions, and the control circuit may be configured to set a threshold voltage Vref based on the feedback signal.

In some embodiments, the control circuits may be configured to set Vfref statically, but on a per-pixel basis. For example, in response to illumination of multiple detector pixels of the detector array 110 from a common light source, the control circuit may be configured to detect or measure which detector pixels are triggered earlier than others (e.g., due to non-uniformities in the detector array 110, such as non-uniform manufacture of the counting capacitor and/or non-uniform I-R (current-resistance) characteristics among pixels), and may perform a calibration step to set respective threshold voltage values Vref for individual detector pixels.

In some embodiments, the control circuits may be configured to set Vfref dynamically, per pixel and/or per zone/region of the detector array 110. For example, the control circuit may be configured to determine, at any given time, which pixels or regions of the detector array 110 are imaging brighter or dimmer objects (e.g., in response to detected photons), and may be configured to set the threshold voltage Vref dynamically for each pixel (or group of pixels corresponding to the region of the array) based on the orientation of the array (e.g., based on the targets to which each pixel/array zone are pointed towards).

As mentioned, embodiments described herein may operate according to a rolling-shutter scheme, e.g., where, if the threshold photon count has been reached, row N is read, before row N+1. In some embodiments, the counter and time integrator circuit outputs for each row may be read simultaneously or in parallel, e.g., using a parallel ADC arrangement with 2 ADCs per column (one for the time integrator circuit, one for the counter circuit). In other embodiments, the counter and time integrator circuit outputs for each row may be read sequentially, with one ADC per column. Each detector pixel may be read out in response to a respective flag signal indicating the threshold number of photon counts needed to resolve a target.

ToF measurement circuits according to embodiments of the present disclosure may thus provide numerous advantages, including but not limited to the following examples. In particular, some embodiments may allow for a dynamic readout rate per pixel within a selected oversampling resolution. For instance, detection signals indicative of closer and/or brighter objects can be readout more frequently, e.g., up to 10 times faster than farther objects, to reduce or avoid saturation of the detector pixel. Also, detection signals indicative of farther, dimmer objects can be readout less frequently, e.g., when the count signal indicates sufficient data collection for ToF calculation, rather than based on a fixed end-of-frame (EoF). A minimum readout rate may also be maintained if the count signal does not indicate sufficient data collection for a predetermined amount of time. A programmable photon count threshold (for generation of the flag signal) can be varied dependent on distance range, reflectivity, and/or other operating conditions, effectively providing a variable subframe that includes more readouts/ higher effective pixel frame rates for closer/more reflective targets, and fewer readouts/lower effective pixel frame rates for farther/less reflective targets. Also, operating schemes as described herein can be maintained where multiple time gates or strobe windows are simultaneously examined in the detector array (e.g., by respective detector pixels), which can save power.

Some embodiments may also be used to reduce readout power consumption, for example, by preventing outputs and conversions for invalid measurements (e.g., where readouts are performed to maintain a minimum frame rate rather than based on sufficient data collection). In addition, some embodiments may be configured to switch between correlated and uncorrelated data, e.g., for close to mid-range targets where sufficient data/signal photons can be collected for accurate ToF measurement. More generally, embodiments described herein can provide circuit operation such that a pixel readout rate can track or otherwise vary with target distance and/or reflectivity.

With respect to analog embodiments, summing multiple analog voltages on a capacitor or integrator may offer advantages with respect to averaging (e.g., reduction in noise); however, the dynamic range of the system may vary with the number of stored voltages when using an ADC (analog-to-digital converter) with fixed voltage references. Other disadvantages may include increased detector readout rates due to the oversampling, and thus, increased input/ output rates. Also, some leakage of a least significant bit (LSB; or n LSBs) may be difficult to avoid within the frame read out time.

Further circuits in accordance with embodiments of the present disclosure may include multiple comparators for determining whether the threshold number of photons have been detected, e.g., one comparator per column (which may be implemented outside of the pixel).

Some embodiments may be configured to freeze-state (e.g., maintain a current state of) the photon counter circuit and/or timestamp integrator circuit when the threshold photon count value Vref is reached, which may reduce data requirements. In some digital circuit implementations described herein, the digital counter and/or digital time integration circuit may be configured to maintain or freeze the count and/or timestamp values when the threshold photon count value is reached. In such digital circuit implementations, there may be no need for a separate control signal to readout counts, as the output of the flag signal Thrs_met flag signal may operate the ADC to convert the count and/or timestamp values.

Figure 8:
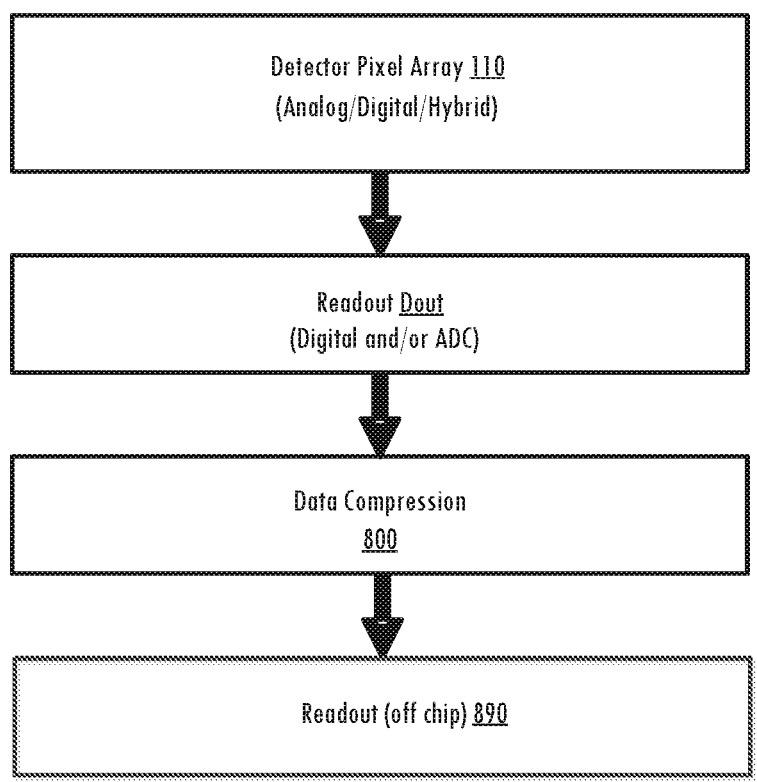
FIG. 8 is a flowchart illustrating the use of data compression schemes in conjunction with some embodiments of the present disclosure.

FIG. 8 illustrates example data compression operations to reduce processing requirements and/or power consumption in accordance with embodiments of the present disclosure. As shown in FIG. 8, in some embodiments, data compression schemes can be used in conjunction with one or more of the embodiments described herein, in order to reduce the number of bits read out from the chip responsive to one or more readout signals (i.e., to reduce data throughput and power). In particular, in some instances, the value of the count signal Vcount may not exceed the threshold Vref before the time required to maintain a minimum readout rate, and thus, a readout signal containing no valid pixel photon count or time of arrival data may be output. For example, a digital readout signal Dout may be output with n-bits of all 0's (or other invalid code or data). Such readout signals containing invalid data can be identified based on output in the absence of the flag signal Thrs_met. Rather than including such readout signals containing invalid data for further processing 890 (e.g., off-chip), some embodiments may utilize data compression schemes 800 to discard such invalid readout signals prior to output of the readout data outside of the detector pixel array 110. The detector pixels from which such invalid readout signals are output can continue to accumulate data (e.g., non-destructively, without resetting counting and/or time integration operations) even after the output of the invalid readout signals.

Figure 9A:
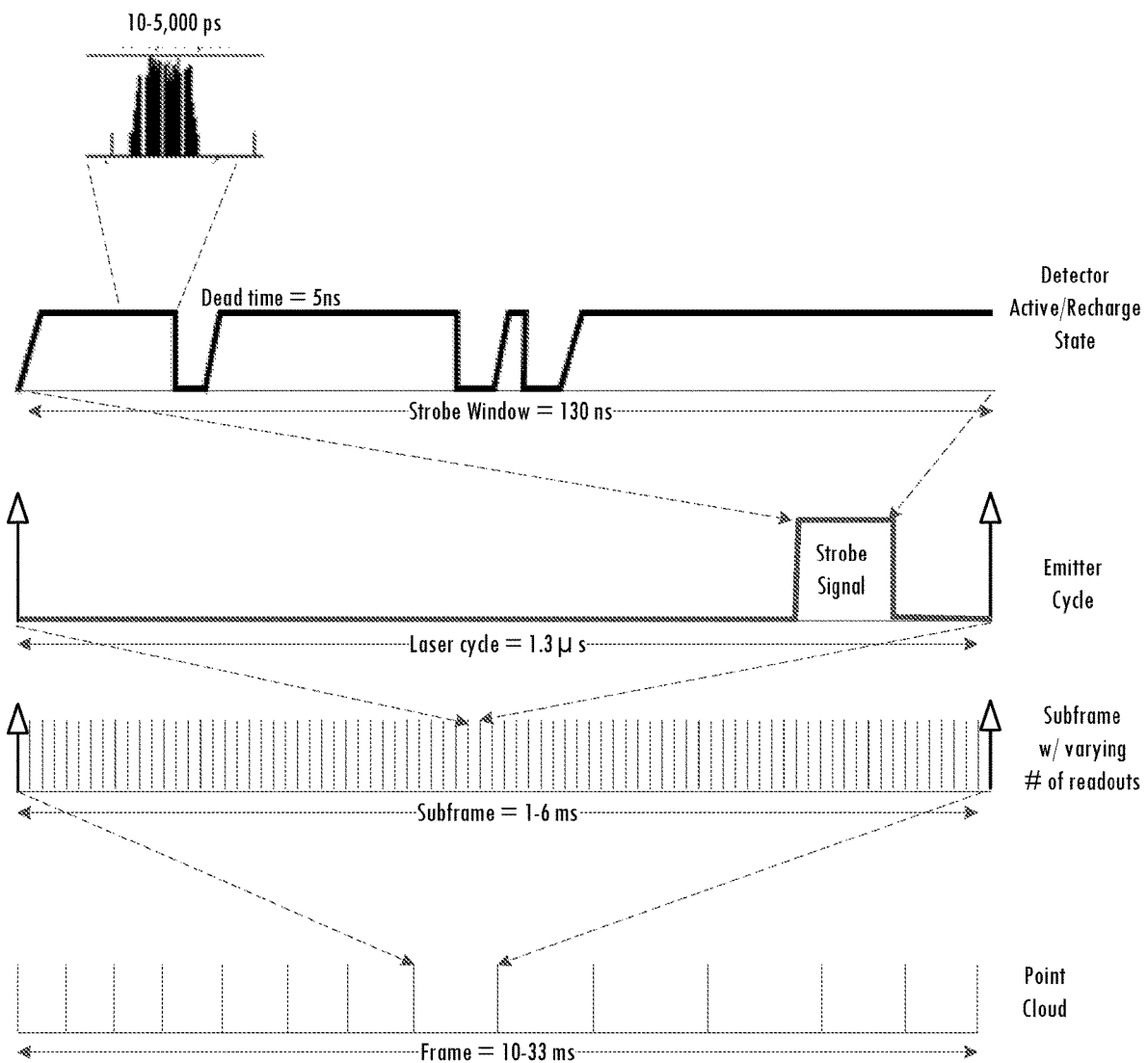
FIGS. 9A and 9B are diagrams illustrating relationships between image frames, subframes, emitter cycles, and strobe windows that may be used in lidar systems in accordance with some embodiments of the present disclosure.
Figure 9B:
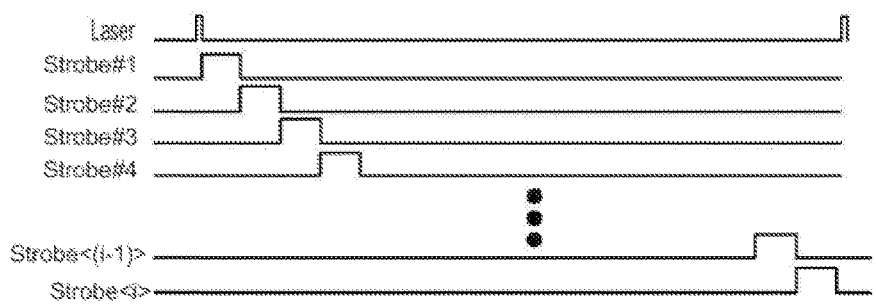

FIG. 9A is a diagram illustrating relationships between frames, subframes, emitter cycles (e.g., laser cycles), and strobe windows as utilized in some lidar systems. FIG. 9B is a diagram illustrating the division of the time period between emitter signal cycles (shown as pulses of the emitter signal Laser) into i strobe windows, with each strobe window 1 to i defining a duration of activation for a detector (e.g., a SPAD) at a respective delay that differs with respect to the laser pulse, responsive to respective strobe signals Strobe #1 to Strobe<i>.

As shown in FIGS. 9A and 9B, a strobe window having a particular duration may be activated during an example laser cycle having a particular time duration between emitted laser pulses. For example, at an operating frequency of 750 kHz, a laser cycle may be about 1.3 μs. Respective time durations within individual laser cycles (e.g., respective timeslots or time slices between laser pulses) may be associated with respective strobe windows. For example, the time duration of the laser cycle may be divided into a plurality of potential strobe window durations, such as, for example, 10 strobe windows of 130 ns each. Respective strobe signals (e.g., output from or under control of the circuits 105, 105') may define the timing and activation of the detectors 110d for the respective strobe windows. The timings shown in FIGS. 9A and 9B are by way of example only, and other timings may be possible in accordance with embodiments described herein.

An image subframe may be based on multiple laser pulses or laser cycles, with a strobe window active in each of the laser cycles. For example, there may be about 1000 laser cycles in each subframe. Each subframe may include data collected for a respective strobe window Strobe<i> that is repeated for multiple (e.g., thousands of) laser cycles. Each subframe for Strobe<i> may correspond to a respective distance sub-range of the overall imaging distance range, which is defined by the frequency of the laser cycle.

Readout operations may thus be performed over the duration of detector activation defined by each strobe window, as well as over one or more laser cycles. As described herein, the number of readout operations included in each subframe may vary depending on when the desired signal ratio is reached. For example, each subframe may include data from a varying number of readout signals, which are output based on a photon count threshold rather than a fixed number of laser cycles. As such, respective readout signals may be output more frequently (relative to the cycles of the laser) responsive to detection signals indicating closer or more reflective targets. For example, the readout rate for a subframe may decrease as the distance subrange (and corresponding strobe window) associated with the subframe increases.

It will be understood that the operations, circuits, and timing diagrams described and illustrated herein are provided by way of example only, and that embodiments of integrators, counters, and/or other circuits described herein are in no way limited to these example implementations.

Although described primarily herein with respect to rolling readout schemes for arrays of detector pixels in which each row is selected sequentially (e.g., in response to read signals RD, RD2) and each column includes respective circuits (e.g., ADCs, comparators) for column-parallel outputs on respective readout lines, it will be understood that operations in accordance with the embodiments described herein can be similarly applied to array-parallel ADC architectures in which readout operations can be performed in parallel for subsets (or 'clusters') of the detector pixels of the array, that is, for pixel sub-arrays of the detector array. The ADCs may be arranged or stacked three-dimensionally under their corresponding subsets or sub-arrays of detector pixels in some embodiments. More generally, the readout circuitry (digital or analog) may be located under a subset of pixels, as opposed to the conventional column parallel architecture. Such array-parallel (also referred to as pixel-parallel or cluster-parallel) ADC image sensor architectures are described, for example, in the publication "A 4.1 Mpix 280 fps Stacked CMOS Image Sensor with Array-Parallel ADC Architecture for Region Control" to Takahashi et al., 2017 Symposium on VLSI Circuits Digest of Technical Papers, pages C244-C245, the disclosure of which is incorporated by reference herein.

Embodiments of the present disclosure have been described herein with reference to light-based ranging measurement systems (such as lidar) and related methods of operation that are configured to detect the quantity and arrival times of incoming photons, to provide in-pixel averaging without digitizing and storing histograms or other data representative of the captured photons. For example, some embodiments may implement rolling center of mass calculation techniques, as described in U.S. patent application Ser. No. 16/688,043 entitled "Digital Pixel" filed Nov. 19, 2019, the disclosure of which is incorporated by reference herein. Such rolling center of mass calculation for estimating ToA (time of arrival) may use a rolling sum of the number of triggered SPADs (without an individual TDC operation for each SPAD), as compared to timestamp summation and averaging techniques that require time to digital conversion.

Some embodiments of the present disclosure are directed to arrays of single-photon detectors and associated control circuits that implement a ToF pixel using digital and/or analog circuit approaches, also referred to herein as a "hybrid pixel". This approach may comprise using both digital and analog circuits for counting and/or timestamping, which can reduce power consumption, area, leakage, and/or data size, and is described for example in U.S. patent application Ser. No. 16/704,548 entitled "Hybrid CMM Pixel" filed Dec. 5, 2019, the disclosure of which is incorporated by reference herein. For example, ToF pixels as described herein may be used for CMM-based calculation of ToF, that is, calculation of the center of mass of the times of arrival (ToA) of the emitter signal photons. However, it will be understood that embodiments of the present disclosure are not limited to CMM-based methods, and may be applied to other ToF methods and/or in other applications for counting/timestamping photon detection events (e.g., purely counting pixels).

In addition, embodiments of the present disclosure may be used in conjunction with operations for dynamically varying emitter power output, as described for example in U.S. Provisional Patent Application No. 62/799,116, entitled "Strobe Window Dependent Illumination Schemes for Flash LIDAR" filed Jan. 31, 2019, the disclosure of which is incorporated by reference herein. For example, a power level of the emitter signal may be reduced in response to one or more readouts that are based on fewer cycles of the emitter signal (indicating a closer and/or more reflective target), or the power level of the emitter signal may be increased in response to one or more readouts that are based on more cycles of the emitter signal (indicating farther and/or less reflective targets).

Likewise, embodiments of the present disclosure may be used in conjunction with operations for dynamically varying the number of active detectors, as described for example in U.S. Provisional Patent Application No. 62/814,452, entitled "Extended Dynamic Range and Reduced Power Imaging and LIDAR SPAD Arrays" filed Mar. 6, 2019, the disclosure of which is incorporated by reference herein. For example, a smaller subset of the detector elements or detector pixels may be activated (e.g., in response to respective strobe signals) in response to one or more readouts that are based on fewer cycles of the emitter signal (indicating a closer and/or more reflective target), or a larger subset of the detector elements or detector pixels may be activated in response to one or more readouts that are based on more cycles of the emitter signal (indicating farther and/or less reflective targets).

Although described herein primarily with reference to detection events based on detection of single photons, it will be understood that counter circuits and/or integration circuits as described herein may be similarly operable with detection events based on detection of two or more photons within a correlation window. For example, each detector pixel may include two or more single photon detectors, and the control circuit(s) may include or be operable responsive to the output of a correlator circuit (also referred to herein as a correlator). The correlator provides output signals identifying detection events in response to detection signals output from one or more detectors. For example, the correlator may identify detection events in response to detection signals output from two or more detectors within a predefined duration or window of time relative to one another, referred to herein as a correlation window or correlation time, where the detection signals indicate arrival times of incident photons within the correlation window. As photons corresponding to the optical signals output from the emitter array 115 may arrive relatively close in time as compared to photons corresponding to ambient light, the correlator can be configured to distinguish signal photons based on respective times of arrival within the correlation time relative to one another. Such correlators are described, for example, in U.S. Patent Application Publication No. 2019/0250257 entitled "Methods and Systems for High-Resolution Long Range Flash Lidar," filed Feb. 12, 2019, the disclosure of which is incorporated by reference herein.

The control circuit 105/processor circuit 105' be small enough to allow for three-dimensionally stacked implementations, e.g., with the array 110 "stacked" on top of the control circuit 105/processor circuit 105' (and other related circuits) that is sized to fit within an area or footprint of the array 110. For example, some embodiments may implement the detector array 110 on a first substrate, and transistor arrays of the circuits 105/105' on a second substrate, with the first and second substrates/wafers bonded in a stacked arrangement, as described for example in U.S. patent application Ser. No. 16/668,271 entitled "High Quantum Efficiency Geiger-Mode Avalanche Diodes Including High Sensitivity Photon Mixing Structures and Arrays Thereof," filed Oct. 30, 2019, the disclosure of which is incorporated by reference herein.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 entitled "Ultra-Small Vertical Cavity Surface Emitting Laser (VCSEL) and Arrays Incorporating the Same," filed Apr. 12, 2018, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concepts to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments are described with respect to systems and/or devices having certain components, but may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the invention being set forth in the following claims.

The invention claimed is:

1. A Light Detection And Ranging (LIDAR) system, comprising:
   an emitter unit comprising one or more emitter elements configured to output an emitter signal;
   a detector array comprising a plurality of detector elements, wherein a respective detector element of the plurality of detector elements is configured to output detection signals in response to photons incident thereon; and
   at least one control circuit configured to:
      receive the detection signals output from the respective detector element over one or more cycles of the emitter signal;
      accumulate a number of the detection signals output from the respective detector element over a time interval corresponding to different distance ranges, wherein the time interval occurs over the one or more cycles of the emitter signal;
      compare the accumulated number of the detection signals over the time interval to a detection threshold;
      generate a flag signal responsive to the accumulated number of the detection signals exceeding the detection threshold; and
      output a readout signal for the respective detector element responsive to the flag signal, the readout signal being output at an end of a current cycle in which the accumulated number of the detection signals exceeded the detection threshold.

2. The LIDAR system of claim 1, wherein the readout signal comprises first and second readout signals, and wherein the at least one control circuit is configured to output the first readout signal responsive to fewer of the cycles of the emitter signal than the second readout signal.

3. The LIDAR system of claim 2, wherein the at least one control circuit is configured to output the first and second readout signals responsive to first and second subsets of the detection signals indicating first and second targets, respectively, wherein the first target is closer to the detector array and/or more reflective than the second target.

4. The LIDAR system of claim 2, wherein a period of the cycles of the emitter signal correspond to a distance range, wherein the at least one control circuit is configured to output the first readout signal responsive to a first plurality of the cycles of the emitter signal corresponding to a first distance subrange of the distance range, and is configured to output the second readout signal responsive to a second plurality of the cycles of the emitter signal corresponding to a second distance subrange of the distance range that is farther than the first distance subrange.

5. The LIDAR system of claim 2, wherein the at least one control circuit is configured to operate the one or more emitters to decrease a power level of the emitter signal responsive to the first readout signal, or to increase the power level of the emitter signal responsive to the second readout signal.

6. The LIDAR system of claim 2, wherein the at least one control circuit is configured to operate the detector array to activate a smaller subset of the detector elements responsive to the first readout signal, or to activate a larger subset of the detector elements responsive to the second read out signal.

7. The LIDAR system of claim 1, wherein the at least one control circuit is configured to output the readout signal responsive to the flag signal and a read signal that is sequentially applied to respective rows or columns of the detector elements in the detector array, and wherein the time interval occurs over two or more cycles of the emitter signal.

8. The LIDAR system of claim 1, wherein the readout signal comprises a count signal and/or a time integration signal, and wherein the LIDAR system is configured to calculate an estimated time of arrival of the photons based on the readout signal.

9. The LIDAR system of claim 8, wherein the at least one control circuit comprises:
   a counter circuit configured to count the detection events indicated by the detection signals, generate the count signal representing a number of the detection events, and output the flag signal responsive to the number of the detection events exceeding the detection threshold; and
   a time integration circuit configured to generate the time integration signal based on respective times of the detection events.

10. The LIDAR system of claim 9, wherein the counter circuit and the time integration circuit are configured to reset the count signal and the time integration signal, respectively, responsive to the flag signal, and to continue to count the detection events and integrate based on the respective times of the detection events, respectively, in the absence of the flag signal.

11. The LIDAR system of claim 1, wherein the respective detector element is configured to output the detection signals in response to the photons incident thereon during a detection window, and wherein the at least one control circuit is configured to generate the flag signal responsive to sampling the detection signals at an oversampling rate having a period that is greater than a duration of a detection window.

12. The LIDAR system of claim 1, wherein the at least one control circuit is configured to set and/or vary the detection threshold responsive to real-time environmental and/or operating conditions indicated by one or more of the detector elements and/or at least one other sensor.

13. The LIDAR system of claim 12, wherein the detection signals indicate a distance range and/or reflectivity of a target facing the respective detector element, and wherein the at least one control circuit is configured to set and/or vary the detection threshold based on the distance range and/or reflectivity of the target.

14. The LIDAR system of claim 12, wherein the at least one control circuit is configured to apply the detection threshold to a subset of the detector elements of the detector array on a per detector element or per region basis.

15. The LIDAR system of claim 1, wherein the detection threshold comprises a number of detection events indicated by the detection signals output from the respective detector element, and is independent of detection signals output from other detector elements of the plurality of detector elements.

16. The LIDAR system of claim 1, wherein the at least one control circuit is configured to output the readout signal for the respective detector element responsive to fewer or more cycles of the emitter signal than readout signals for other detector elements of the plurality of detector elements.

17. A method of operating a Light Detection And Ranging (LIDAR) system, the method comprising:
   performing, by at least one control circuit, operations comprising:
      receiving, from a respective detector element of a detector array comprising a plurality of detector elements in response to photons incident thereon, detection signals output over one or more cycles of an emitter signal output from an emitter unit comprising one or more emitter elements;

accumulating a number of the detection signals output from the respective detector element over a time interval corresponding to different distance ranges, wherein the time interval occurs over the one or more cycles of the emitter signal;

comparing the accumulated number of the detection signals over the time interval to a detection threshold;

generating a flag signal responsive to the accumulated number of the detection signals exceeding the detection threshold; and outputting a readout signal for the respective detector element responsive to the flag signal, the readout signal being output at an end of a current cycle in which the accumulated number of the detection signals exceeded the detection threshold.

18. The method of claim 17, wherein the readout signal comprises first and second readout signals, and wherein the first readout signal is output responsive to fewer of the cycles of the emitter signal than the second readout signal.

19. The method of claim 18, wherein the first and second readout signals are output responsive to first and second subsets of the detection signals indicating first and second targets, respectively, wherein the first target is closer to the detector array and/or more reflective than the second target.

20. The method of claim 18, wherein a period of the cycles of the emitter signal correspond to a distance range, wherein the first readout signal is output responsive to a first plurality of the cycles of the emitter signal corresponding to first distance subrange of the distance range, and the second readout signal is output responsive to a second plurality of the cycles of the emitter signal corresponding to a second distance subrange of the distance range that is farther than the first distance subrange.

21. The method of claim 17, wherein the readout signal is output responsive to the flag signal and a read signal that is sequentially applied to respective rows or columns of the detector elements in the detector array.

22. A Light Detection And Ranging (LIDAR) system, comprising:

an emitter unit comprising one or more emitter elements configured to output an emitter signal;

a detector array comprising a plurality of detector elements, wherein a respective detector element of the plurality of detector element is configured to output detection signals in response to photons incident thereon; and at least one control circuit configured to receive the detection signals output from the respective detector element over one or more cycles of the emitter signal, wherein the at least one control circuit comprises:

a counter circuit configured to accumulate detection signals over a time interval corresponding to different distance ranges and occurring over the one or more cycles of the emitter signal, compare the accumulated number of the detection signals over the time interval to a detection threshold, and output a flag signal responsive to the accumulated number of the detection signals exceeding the detection threshold; and a time integration circuit configured to generate a time integration signal based on respective times of the detection events, wherein the at least one control circuit is configured to output a readout signal at an end of a current cycle in which the accumulated number of the detection signals exceeded the detection threshold, the readout signal comprising the count signal and/or the time integration signal for the respective detector element responsive to the flag signal and a read signal that is sequentially applied to respective rows or columns of the detector elements in the detector array.

* * * * *